Jan. 5, 1971  J. J. SKUBIAK ET AL  3,553,570

AUTOMATIC BILLET INSPECTOR

Original Filed Nov. 1, 1965

INVENTORS
John J. Skubiak
John A. Toth

BY Watts, Hoffmann,
Fisher & Heinke
ATTORNEYS

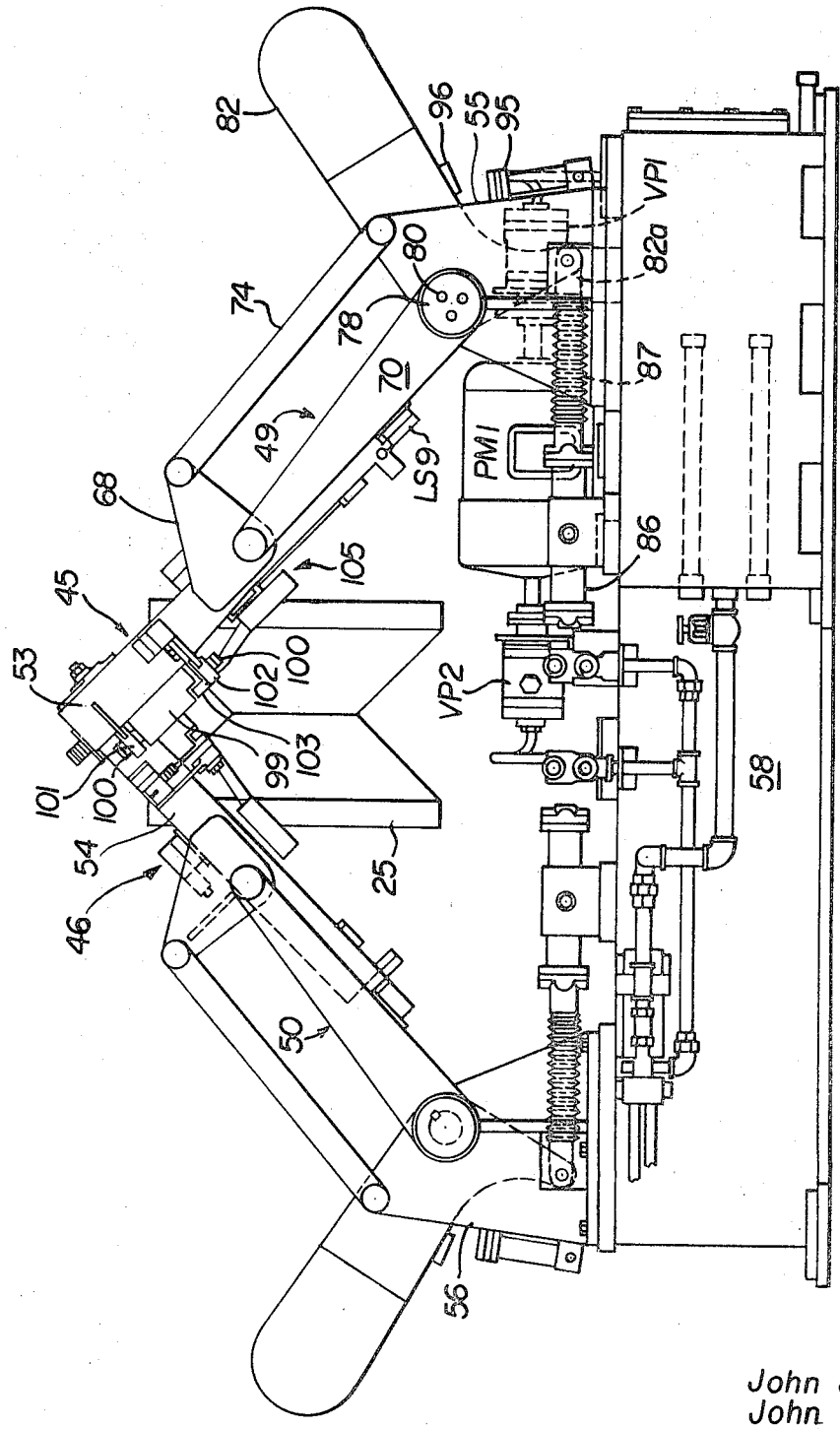

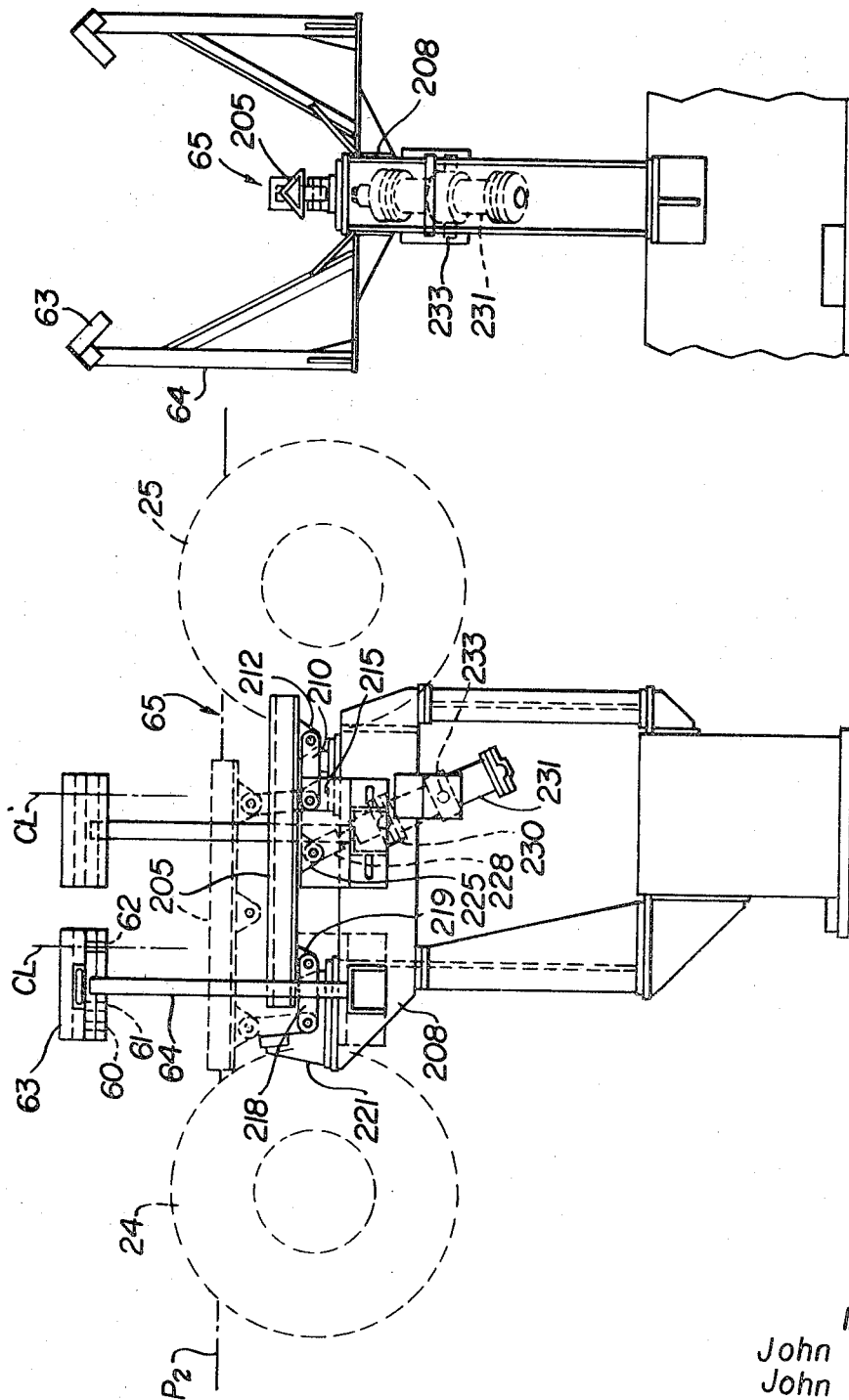

INVENTORS
John J. Skubiak
John A. Toth

BY Watts, Hoffmann, Fisher & Heinke

ATTORNEYS

INVENTORS
John J. Skubiak
John A. Toth

BY Watts, Hoffmann,
Fisher & Heinke

ATTORNEYS

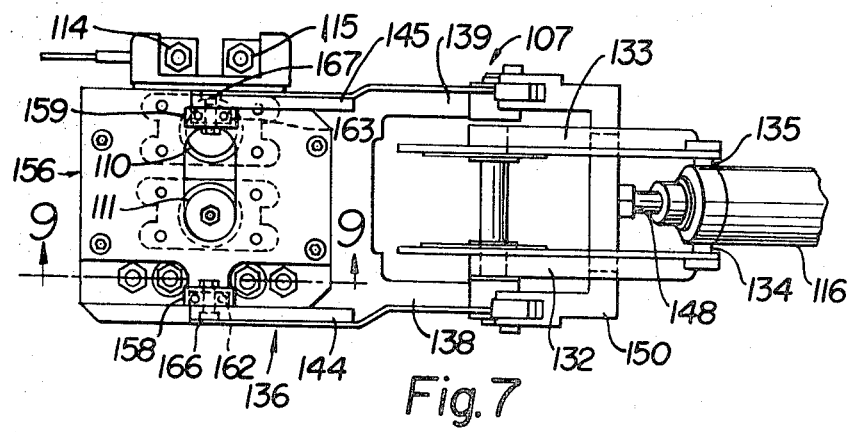
Fig. 7
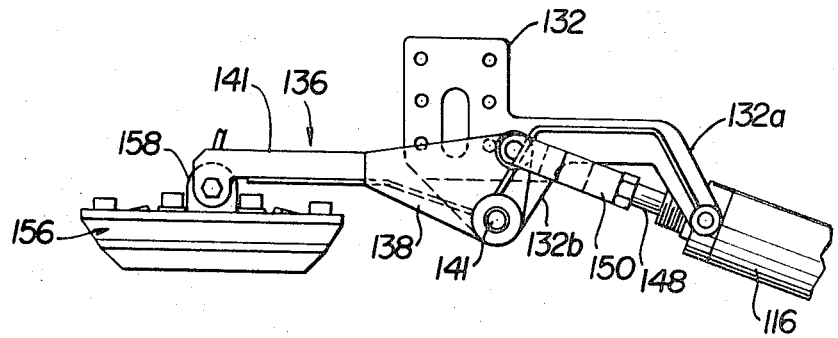
Fig. 8
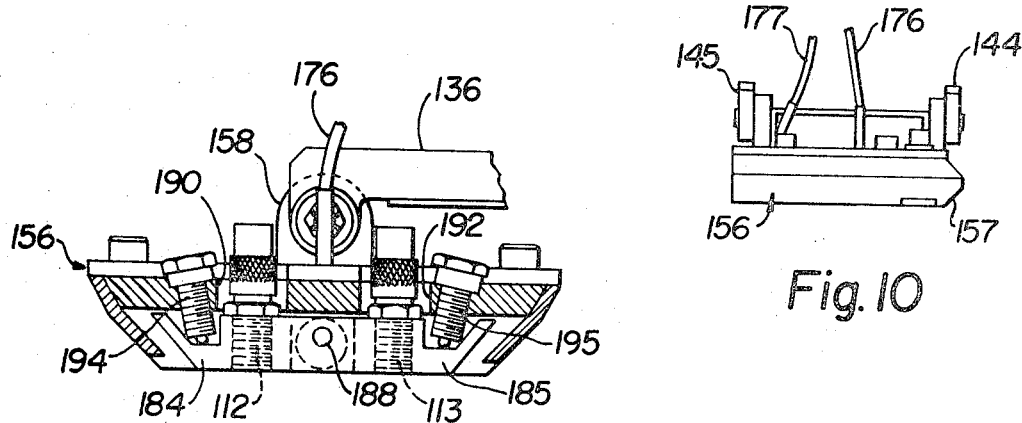
Fig. 9
Fig. 10
INVENTORS
John J. Skubiak
John A. Toth
BY Watts, Hoffmann,
Fisher & Heinke
ATTORNEYS.

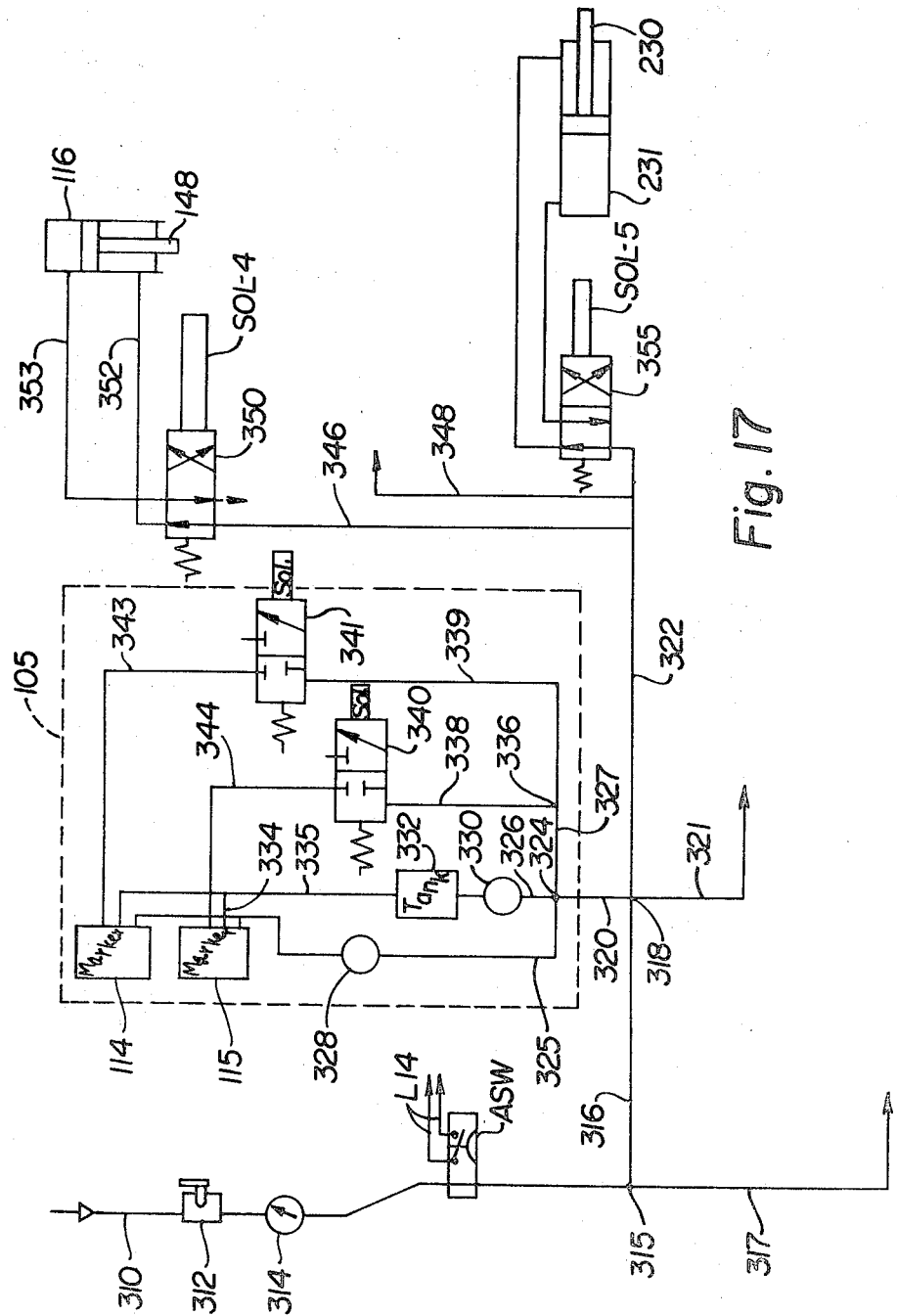

United States Patent Office 3,553,570
Patented Jan. 5, 1971

3,553,570
AUTOMATIC BILLET INSPECTOR
John J. Skubiak, Madison Heights, Mich., and John A. Toth, Highland Heights, Ohio, assignors to Republic Steel Corporation, Cleveland, Ohio, a corporation of New Jersey
Original application Nov. 1, 1965, Ser. No. 505,940. Divided and this application Jan. 22, 1969, Ser. No. 792,968
Int. Cl. G01r 33/12
U.S. Cl. 324—37　　　　　　　　　　　　　　　13 Claims

ABSTRACT OF THE DISCLOSURE

Metal billets are conveyed past a defect scanning unit that reciprocates search coils across a billet surface. The scanning unit is movable to a position adjacent the billet surface and the search coils are independently positioned on the billet surface. Scanning unit movement across the billet is reversed in response to sensing of billet edges.

---

This application is a divisional application of Ser. No. 505,940, filed Nov. 1, 1965.

This invention relates to the inspection of metal objects, and more especially steel billets, particularly for detecting and evaluating surface defects in steel billets.

The surface characteristics of steel billets are such that the detection of defects is difficult. Superficial cracks may be almost, if not entirely, invisible to the naked eye. Moreover, the surface appearance of a defect often affords no indication of the depth and, therefore, the significance of the defect.

Methods and apparatus for detecting the presence of flaws or imperfections of the type referred to above by measurements conducted at the surface of a metal test piece are disclosed in U.S. Pat. No. 2,660,704 issued to William C. Harmon et al.; and in U.S. Pats. Nos. 2,832,- 040; 2,914,726; and 2,979,196 issued to William C. Harmon. In the apparatus disclosed in the above patents, a high frequency oscillator is utilized to energize a search coil. The search coil generates an electromagnetic field. When the search coil is placed adjacent a billet or other metallic object to be tested, the reaction produced upon the search coil by the interaction of the test object with the electromagnetic field modifies the operation of the high frequency oscillator in accordance with the flaw in the metal of the test piece. The effect of the metal object being tested upon the performance of the oscillator as the search coil is moved relative to the surface of the object thus provides a measure of the presence or absence of flaws in the test object.

Seams and other defects must be detected and removed from steel billets before the billets are rolled so that the resulting products are not defective. Once the defects are located, they are removed by grinding or scarfing the billet in the area of the seam. The seam or other defect must not only be located, but also the severity of the defect must be evaluated so that the worker scarfing the billet need not waste time on defects that appear to be serious, but are actually only superficial blemishes.

Several characteristics of steel billets make them extremely difficult to inspect automatically. These include, (1) the billets are made in a wide variety of lengths and cross sectional areas, (2) frequently the billets are bent or twisted longitudinally, (3) when the billets are cut off, jagged stiff projections known as burrs or snags often remain on the ends of the billets and (4) steel slivers often project from surfaces of the billet intermediate the ends. These projections interfere with both billet feeding and scanning. Accordingly, it has been the general practice to inspect such articles visually or occasionally with portable detectors having a search coil or probe that is moved by hand over the surface of the object. Such methods are, of course, slow and inefficient. They often result in scarfing of superficial blemishes with the appearance of serious defects. Conversely, and more importantly, serious defects are often overlooked.

In accordance with the present invention, methods and apparatus are provided to facilitate the automatic handling and inspecting of large steel billets of different sizes. An arrangement is provided so that two surfaces of rectangular shaped billets may be simultaneously scanned. In addition, two inspection assemblies are arranged in sequence, to automatically inspect the four major surfaces of such billets.

Billets to be inspected in accordance with this invention are usually first grit-blasted to provide a clean, scale-free surface to permit close inspection tolerances, accurate indications of changes in the electromagnetic field used for detecting defects, and to facilitate the adherence of material, such as paint, used to mark the presence of any defects detected. After the initial preparation, the billets are conveyed along a predetermined horizontal path past a first inspection station. The billet is conveyed by V-rollers so that two adjacent longitudinal surfaces of the billet face upward, each at a 45 degree angle from the horizontal. Two scanning heads are provided at the inspection station, one for each upper surface of the billet, so that two surfaces of the billet may be simultaneously inspected. A mounting arm is located on each side of the path along which the billet is conveyed and supports one of the two scanning heads. Each arm extends at essentially a 45 degree angle from the horizontal and may be pivoted toward and away from a position adjacent the billet. A suitable parallel linkage associated with the arm and scanning head maintains the head parallel to the surface of the billet when the supporting arm is pivoted.

Each scanning head includes a pair of twin search coils for sensing defects, two spaced proximity coils for detecting the longitudinally extending edges formed by adjacent surfaces of the billet, and a pair of markers for indicating the presence and location of any defect detected in the billet. The scanning heads are mounted on the arms for independent movement transversely of the billet. The search coils and proximity coils are supported by the scanning unit for independent movement into and out of direct contact with the billet once the mounting arms are lowered into a position where the scanning heads are adjacent to the billet. Appropriate timing of this independent movement protects the coils from the burrs or snags that extend from the ends of the billet and otherwise sometimes catch the search unit and destroy part or all of the unit.

A control system is provided to automatically initiate and control the three modes of movement of each of the scanning heads in response to the presence, location and size of the billet. Two light beams for each scanning head are directed across the predetermined path along which the billet is conveyed and are received by two photo-electric cells. When the billet intercepts the beams, its presence at the inspection station is sensed. As a result, at the appropriate time the control system causes the mounting arms suporting the scanning heads to rapidly move transversely of the billet to position each scanning head adjacent one of the two upward-facing billet surfaces. A cam lever carried by each of the mounting arms and extending outwardly from the scanning head (i.e., toward the billet) contacts the surface of the billet when the arms reach a position proximate to the billet. This causes a reduction in the speed at which the mounting arms approach the billet before actual contact is made. Further actuation of the cam lever causes a counterbalancing force to be applied to the mounting arm to diminish the force with which the arm is held in an inspecting position against the surface of the billet. Rollers carried by the mounting arms adjacent each scanning head roll on the surface of the billet being inspected to insure that the scanning head is properly located with respect to the surface being inspected. Thus, firm contact is maintained even if the billet is longitudinally bowed or has an uneven surface. The further actuation of the cam lever, above mentioned, plus the interruption by the billet of a third light beam associated with each scanning head initiates a lowering of the search coils of the scanning head to the billet. This occurs only after the end of the billet has moved beyond the inspection station so that the scanning unit will not be damaged by the end of the billet, which may extend out of the desired path if the billet is bowed or which may carry burrs or snags that could catch the search coil unit.

With the scanning head and search coils in proper position adjacent the surface of the billet to be inspected, the scanning head is automatically reciprocated relative to both the mounting arm and the billet, in a direction transverse to the billet movement. The distance that the scanning head is moved in the transverse direction is controlled by an upper and lower proximity coil on each side of the scanning coils. When the scanning head approaches either the upper or lower lateral edge of the billet surface during reciprocation, one of the proximity coils is moved beyond the edge of the billet. This condition is sensed electrically and the direction of movement is reversed.

The longitudinal movement of the billet and the transverse reciprocating movement of the scanning heads create a zigzag scanning path of each pair of search coils across the respective upward-facing surface of the billet. Paint markers carried by each scanning head are positioned with respect to the search coils so that they follow the same path over the billet just behind the search coils. The paint markers are triggered when the search coils sense a defect of a predetermined minimum severity and deposit a paint mark upon the billet directly over the location where the defect was detected. The marking system is preferably of the type described and claimed in U.S. patent application Ser. No. 287,987 filed June 14, 1963 by Joseph M. Mandula et al. under the title "High Speed Marking System," now patent No. 3,418,567.

When the billet leaves the inspecting station, the light beams are no longer interrupted, and the inspection stops. The mounting arms are automatically withdrawn to the original position, ready for the next billet.

Defects are detected by the search coils of the scanning head. The coils, as suggested above, establish an electromagnetic field in the article being tested and also detect variations in the field caused by flaws in the article. The search coils themselves need not actually touch the article being inspected, but should be closely spaced therefrom. They may be properly located with respect to the article surface by a wear plate interposed between the coils and the article and adapted to slide on the surface of the article. The search coils are energized by an oscillating vacuum tube and generate currents in the steel or other metal being tested. When a flaw in the metal is encountered, the loading of the search coils is decreased and therefore the output of the oscillator increases. This variation in oscillator output is detected by an electrical system.

Another feature of this invention is the provision of a built-in calibration surface that may be selectively positioned in a location at a billet inspecting station. The scanning heads may be then located adjacent the calibrating surface and the sensitivity of the search coils adjusted so that only those seams that exceed a preset depth or severity will be marked during the inspection.

The present invention is applicable to a large range of sizes of billets without necessitating adjustment of the apparatus for each individual size, it is capable of greatly reducing the handling costs directly related to billet inspection, and it reduces unnecessary subsequent conditioning of billets where only minor or superficial defects exist. By efficiently, accurately and automatically detecting and marking objectional defects of predetermined severity in steel billets, the present invention greatly reduces or eliminates the expensive and wasteful processing of defective material into finished or semi-finished parts.

Other attendant advantages and the features of this invention will be readily appreciated as the same become better understood by reference to the following detailed description, when considered in connection with the accompanying drawings in which:

FIG. 2 is an end elevational view of the inspection station shown at the right side of FIG. 1, showing two scanning units and support arms of the inspection station in position to inspect a billet;

FIG. 3 is a partial side elevational view of the inspection station of FIG. 2, with parts removed, showing a calibrating mechanism used in conjunction with the inspection station;

FIG. 4 is an end elevational view of the calibrating structure shown in FIG. 3;

FIG. 7 is a fragmentary top plan view of the search unit subassembly of the scanning unit, which can be independently lowered into contact with a billet and which senses defects and produces signals for controlling the reciprocation of the scanning unit;

FIG. 8 is a side elevational view of the subassembly of FIG. 7;

FIG. 9 is a sectional view of the sensing coil housing, taken along the lines 9—9 of FIG. 7 and showing details of the proximity coils and associated structure;

FIG. 10 is an end elevational view of the sensing coil housing of FIG. 7;

Figure 18:
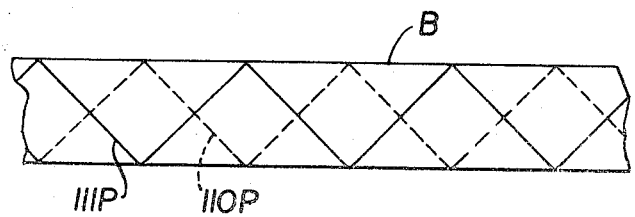

FIG. 17 is a diagrammatic layout of the pneumatic system for raising and lowering the sensing coils relative to the billet and for raising and lowering the calibration bar, as well as for operating the defect markers; and FIG. 18 is a fragmentary view of a surface of a billet of the type inspected by the apparatus disclosed herein, diagrammatically showing the scanning path followed by the sensing coils of a scanning unit as the billet is moved longitudinally through the inspection station.

(I) GENERAL MECHANICAL ARRANGEMENT

Figure 1:
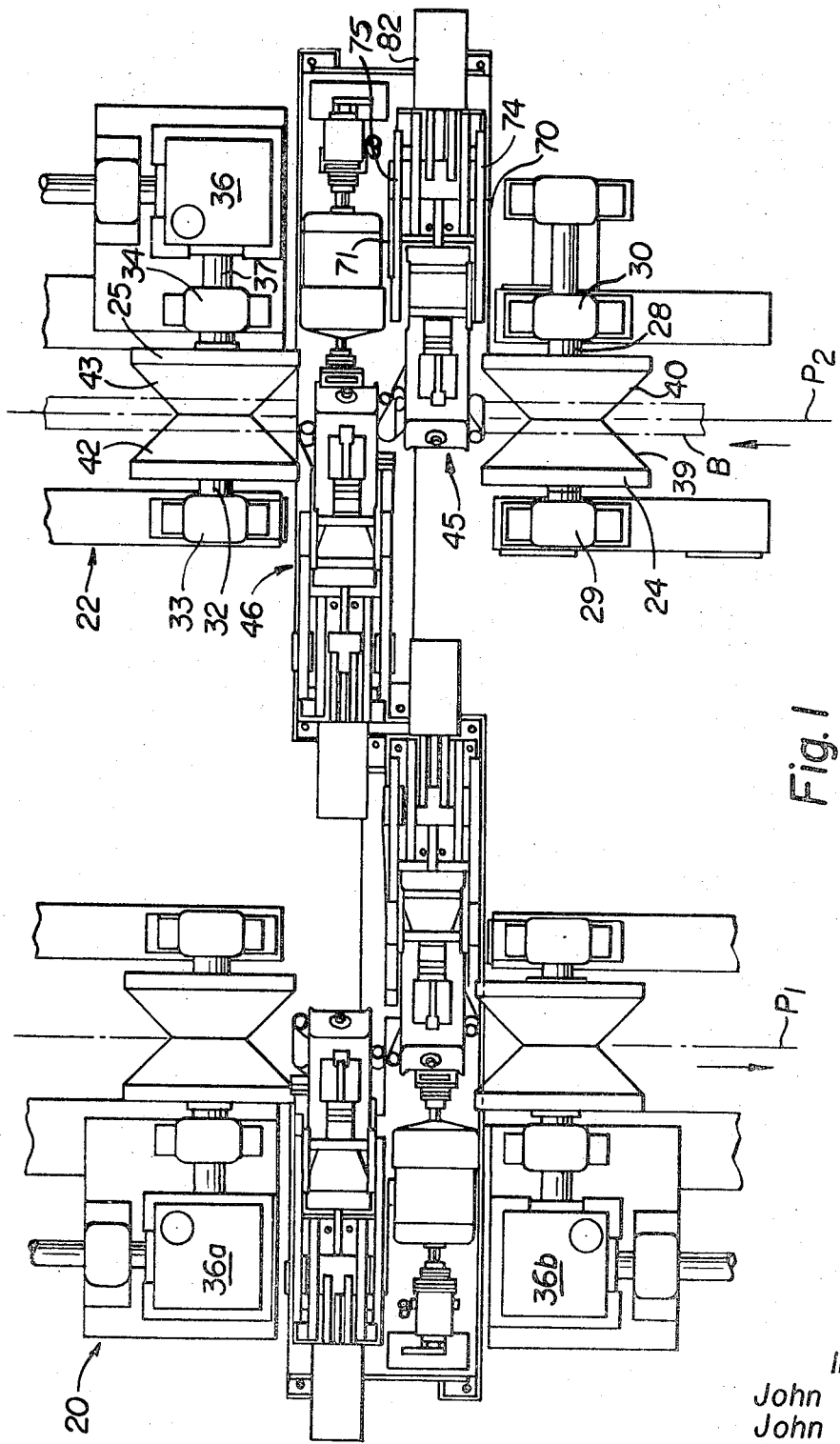
FIG. 1 is a top plan view showing the overall arrangement of two inspection stations constructed and arranged in accordance with the present invention for automatically inspecting steel billets.
Figure 11:
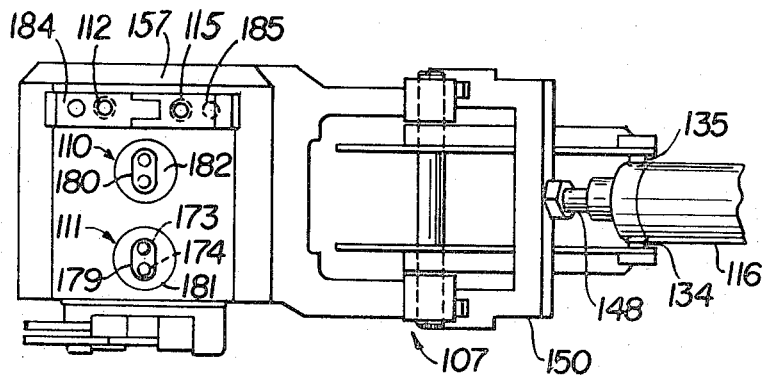
FIG. 11 is a bottom plan view of the sensing coil housing of FIG. 7, showing details of the defect sensing coil.

The general arrangement of two inspecting stations constructed in accordance with this invention and arranged to sequentially inspect adjacent pairs of billet surfaces is shown in FIG. 1 of the drawings. First and second inspection stations are indicated generally by the reference numerals 20 and 22, respectively. In the arrangement shown, the two inspection stations are in side by side relationship; the inspecting station 20 receives a billet moving in the direction of the arrow along a predetermined horizontal path $P_1$. After a billet has passed completely through the station 20 along path $P_1$ it is turned over by a suitable mechanism, not shown. The billet is then fed into the second inspection station 22. The billet moves in the opposite direction through the second station 22 as shown by the arrow along a predetermined horizontal path $P_2$. A billet B is shown in phantom in the station 22. Because the mechanisms providing the two inspection stations are identical, only mechanism providing the second inspection station 22 will be described in detail. It will be understood, of course, that all four sides could be scanned at one station or successive stations without turning the billet over by providing two additional arms that move into position adjacent the lower surfaces of the billet.

Two conveying rolls 24, 25 are longitudinally spaced along the path $P_2$. Each conveying roll 24, 25 rotates about a horizontal axis that extends at right angles to the path of travel $P_2$. The roll 24 is supported for rotation upon a horizontal shaft 28 supported at each end by journal bearings 29 and 30. Similarly, the conveying roll 25 is supported by a horizontal shaft 32 supported at each end by journal bearings 33 and 34. One or both of the conveying rolls may be driven. In the embodiment shown, the roll 25 is driven through a gear box 36 having an output shaft 37 coupled to the supporting shaft 32, and conveying roll 24 is an idler roll. In contrast, both rolls shown in the arrangement of the first inspection 20 are driven by gear boxes 36a, 36b respectively.

The two conveying rolls 24, 25 are constructed with a V-shaped periphery so as to have two surfaces 39, 40 on the roll 24 and 42, 43 on the roll 25 positioned at right angles to each other to receive a longitudinally extending edge or corner of a square or rectangular billet.

Two inspection assemblies 45, 46 are located between the two conveying rolls 24, 25 and extend across the path $P_2$. As more clearly shown in FIG. 2, the inspection assemblies 45, 46 each consist essentially of a support arm 49, 50 and an attached housing 53, 54, respectively, which carry units for scanning and inspecting a steel billet. Each arm 49, 50 is pivotally supported at a lower end upon a mounting bracket 55, 56, respectively. The mounting brackets are supported on opposite sides of the path $P_2$ by a base housing, indicated generally at 58. The arms 49, 50 may be pivoted about the mounting brackets toward and away from the path $P_2$ in the area between the two conveying rolls 24, 25. In this manner, the arms bring the billet scanning units carried by the housings 53, 54 into position to inspect the billet and then out of position to receive a new billet.

Various control elements are located at the inspection stations, including three photo electric cells and light sources for each scanning unit. In FIG. 3, three cells 60, 61, 62 for the inspection assembly 45 are digarammatically shown in alignment along the billet path. They are mounted in a housing 63 on a bracket 64. These cells detect the presence and location of the billet to be inspected. Additional control elements are carried by the housings 53, 54, and will be described in more detail subsequently.

A calibrating bar and actuating mechanism, as shown in FIGS. 3 and 4, and indicated generally by the reference numeral 65, is associated with each inspection station 20, 22 and is located between the two conveying rolls, just beneath the path of travel of the billet. As will be explained in more detail subsequently, before the inspection of a billet, the calibrating bar may be raised at the inspecting station to a position occupied by a billet when the device is in use. The inspection assemblies may then be lowered and calibrated to a desired degree of sensitivity. The calibrating bar is then lowered, and a billet or series of billets inspected.

(II) THE SCANNING ASSEMBLIES

(A) Support arms

Reference is made particularly to FIGS. 1 and 2 of the drawings. Because both inspection assemblies 45 and 46 are identical but reversed, only the inspection assembly 45 will be described in detail.

The main support arm 49 pivoted on the mounting bracket 55 supports a housing bracket 68 at its distal end. Two, spaced, parallel arm members 70, 71 extend upward at an angle from each side of the mounting bracket 55 toward the path $P_2$. When the arm members 70, 71 are in a lowered position to inspect a billet, as shown in FIG. 2, they extend at approximately a 45 degree angle from the horizontal. A pair of parallel links 74, 75 are each associated with a corresponding one of the spaced arm members 70, 71. The links extend parallel to and above the arm members between the mounting bracket 55 and the housing bracket 68. The parallel links 74, 75 and the spaced arm members 70, 71 are pivotally secured to both the mounting bracket 55 and the housing bracket 68. Together, the arm members, the links and the brackets 55, 68 form a parallelogram linkage. This linkage maintains the bottom of the housing 53 carried by the housing bracket 68 at a 45 degree angle with the horizontal, regardless of the angular position of the spaced arm members 70, 71.

The spaced arm members 70, 71 are supported on the mounting bracket 55 by a rotatable shaft 78 and are secured in fixed relationship with the shaft 78 by three, wire-locked, screws 80. A counter weight 82, in the general form of a bell crank, is carried by the rotatable shaft 78 and keyed or otherwise secured for rotation with the shaft. As best seen from FIG. 2, the counter weight 82 extends from the mounting bracket 55 at an obtuse angle from the arm 49 to counter balance the moment of the support arm 49. A lower extending portion 82a of the counterweight 82 acts as a lever arm, to pivot the counterweight 82 in the manner of a bell crank about the axis of rotation of the rotatable shaft 78. Such rotation of the counterweight 82 is effected by a hydraulic cylinder 86 fastened to the base member 58. A piston rod 87 of the cylinder 86 is connected to the lower extending portion 82a of the counterweight. Hydraulic fluid under pressure is supplied to the hydraulic cylinder 86 and other units of a hydraulic system used to operate the inspection assembly by variable volume pumps VP1, VP2 driven by an electric motor PM1, all associated with the base 58.

Pivotal movement of the support arm 49 about the axis of rotation of the rotatable shaft 78 in a direction away from the path $P_2$ is limited by a mechanical stop element 95 on the base 58. The stop 95 cooperates with a block 96 carried by the counterweight 82. Downward movement of the support arm 49 is normally limited by a steel billet carried by the conveying rolls 24, 25. A safety switch LS–9 is carried by the arm 49, which switch is actuated by a stop (not shown) in the event the arm 49 is lowered in the absence of a billet.

Figure 5:
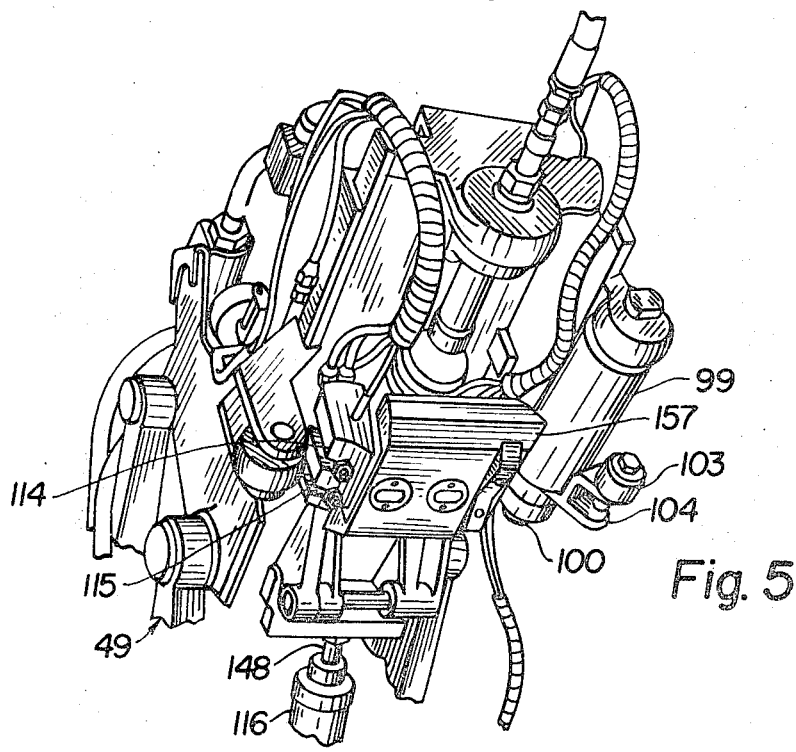
FIG. 5 is a diagrammatic perspective view of one of the scanning units of FIG. 2, showing details of the main roller, sensing roller and the housing for the sensing coils.

A main roller 99 is supported across the lower surface of the housing 53, FIGS. 2 and 5. The main roller 99 has an axis of rotation extending parallel to the bottom of the housing 53 and transversely of the direction of the billet movement. Journals 100 at each end of the roller 99 are supported for rotation in bearings 101, 102 carried by the housing 53. The roller 99 is adapted to ride upon the surface of the billet being inspected when the support arm 49 is in lowered position.

A limit switch actuator comprised of a sensing roller 103 carried on a lever arm 104 (see FIG. 5) is pivoted about a journal 100 and extends outwardly from housing 53 and roller 99. The sensing roller is carried with the arm 49 and, as the arm approaches the scanning position, the sensing roller contacts the surface of the billet before the main roller 99. Billet contact by the sensing roller rotates the lever arm 104 and operates a limit switch in the control circuit. As will be described in more detail, actuation of the limit switch reduces the speed at which the arm 49 approaches the billet. Further rotation of the lever arm 104, as the arm 49 carries the roller 99 into contact with the billet, actuates a second limit switch in the control circuit to apply a counter force in the hydraulic actuator 86 to reduce the contact pressure between the main roller 99 and the billet from that pressure utilized to move the arm 49 into position. Thus, the arm is maintained in scanning position under a reduced force, with the roller 99 riding on the surface being inspected. This maintains the scanning unit at a fixed distance from the surface of the billet, even though the surface is not uniform.

(B) Scanning unit

Figure 6:
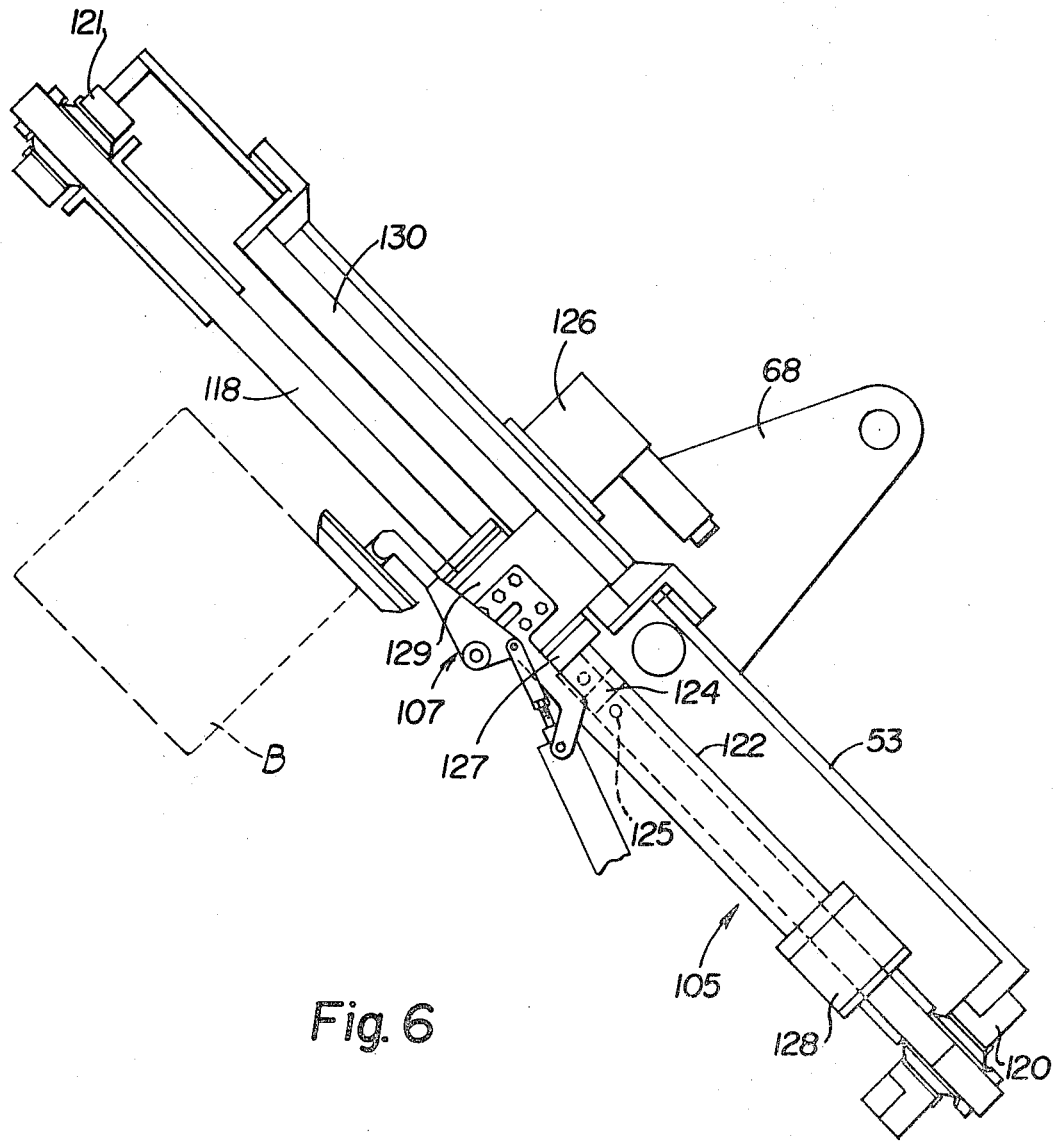
FIG. 6 is a side elevational detailed view of the scanning unit, showing the mounting means and means for reciprocating the scanning unit.

As best shown in FIGS. 2 and 6, a scanning unit, indicated generally by reference numeral 105, is carried by the housing 53 of the support arm 49. A similar scanning unit is carried by the housing 54 of support arm 50 and, being the same as the other, will not be described in detail.

The scanning unit 105 is supported by the housing 53 for reciprocation transversely of the billet movement. The unit includes a subassembly 107, which is separately movable into and out of direct contact with a billet after the housing 53 is positioned over the billet by the arm 49. See FIGS. 7–11. The subassembly includes twin search coils 110, 111 that detect defects in the billet, and proximity coils 112, 113 that signal a reversal of the scanning unit movement at the edges of the billet. Two paint markers 114, 115 are carried by the scanning unit for reciprocation along with search coils to mark the presence and location of any defects. An air cylinder 116 is carried to actuate the subassembly into and out of contact with the billet.

The housing 53 supports a cylinder rod 118 extending in a direction transversely of the path of billet movement. The rod is tubular and supported at each end by supports 120, 121 of the housing. A movable hydraulic cylinder 122 surrounds the fixed cylinder rod 118 and reciprocates along the rod. A stationary piston 124 is fixed to the cylinder rod intermediate the ends of the rod and within the movable cylinder 122. The rod is divided by a baffle or is otherwise plugged at the plane of the piston to isolate the end of the rod on one side of the piston from the other end.

Hydraulic fluid lines, shown schematically in FIG. 16, which will be described in more detail subsequently, are connected to each end of the cylinder rod 118. Openings 125 are located in the wall of the cylinder rod on each side of the piston. With this arrangement, fluid introduced into one end of the cylinder rod 118 fills the cylinder on that side of the piston, thereby moving the cylinder toward the end of the cylinder rod through which the fluid is introduced. At the same time, fluid on the other side of the piston in the cylinder 122 escapes into the cylinder rod 118 and out the opposite end of the rod. A control valve 126 is supported by the housing 53 and controls the direction in which hydraulic fluid is introduced into the cylinder 122. The manner in which the valve 126 is actuated will be described in more detail subsequently in connection with the control system of the invention.

A front end cap 127 and rear end cap 128 are provided on the cylinder 122 to closely encircle the cylinder rod 118. The front end cap 127 carries an adapter 129 that receives a guide rail 130, which is fixed to the housing 53. The guide rail extends parallel to the cylinder rod 118 and maintains the cylinder in proper alignment, preventing the cylinder from rotating about the rod. A pair of spaced brackets 132, 133 are secured to the adapter 129. The brackets attach the subassembly 107 and the actuating air cylinder 116 to the movable hydraulic cylinder 122 for reciprocation relative to the billet.

As best shown in FIGS. 7 and 8, the bracket 132 includes a rearwardly extending arm 132a and a depending portion 132b. Bracket 133 is similarly formed and is located parallel to the bracket 132 on the opposite side of the cylinder 122. The air cylinder 116 is pivotally mounted between the rearwardly extending arm portions 132a, 133a by journals 134, 135 at the forward end of the air cylinder.

A mounting bracket 136 is provided to secure a search coil housing 156 to the brackets 132, 133. The mounting bracket 136 has two rearwardly extending legs 138, 139 which are mounted to the brackets 132 and 133, respectively. Each leg 138, 139 is generally triangular in shape in side elevation, as best shown in FIG. 8, and a lower portion of the base of each triangular-shaped bracket is secured to the depending portion 132b, 133b, respectively, by a shaft 141. The shaft 141 permits pivotal movement of the mounting bracket 136 with respect to the brackets 132, 133. Two parallel spaced arms 144, 145 form the forwardly extending portion of the mounting bracket 136 and support the search coil housing 156.

A piston rod 148 extends from the front of the air cylinder 116 and is suitably secured to the cross piece of a clevis 150. Each extending arm of the clevis 150 is pivotally connected to the upper corner of the base of each triangular shaped leg 138, 139 of the mounting bracket 136. With this arrangement, actuation of the air cylinder pivots the mounting bracket 136 about the shaft 141 fastened to the brackets 132, 133, which are carried by the movable hydraulic cylinder 122. This moves the search coil housing 156 into and out of direct contact with the billet being inspected after the inspection assembly 45 has been lowered into scanning position, with the main roller 99 riding on the surface of the billet.

The housing 156 is of generally rectangular configuration, with an inclined lower edge 157 about the three sides that are leading edges with respect to the directions of relative movement between the billet and the housing. These edges flatten or ride over slivers on the surface of the billet which would otherwise catch the scanning unit. Lugs 158 and 159 extend upward from the housing, one along each of two opposite lateral sides, centrally of the housing. Bearings 162, 163 within the lugs 158, 159 receive shoulder screws 166, 167, which extend through the forward arms 144, 145 of the mounting bracket 136. In this manner, the housing 156 is pivotally supported at the forward portion of the mounting bracket 136.

Two twin search-coil assemblies 110, 111 are carried in a central portion of the housing, essentially flush with the bottom surface of the housing. The two twin search-coil assemblies 110, 111 are aligned transversely of the housing 156, so that their axis of alignment extends at right angles to the direction in which the housing 156 is reciprocated by the movable hydraulic cylinder 122. Each twin search-coil assembly is comprised of two search-coils, those coils of twin search-coil assembly 111 being indicated at 173 and 174. See FIG. 11. Each coil is formed of a large number of turns of relatively fine wire, wound into a flat, circular form that might be termed a "pancake" coil, and the two coils of each twin search-coil assembly are electrically connected together in series opposition. Twin search-coil assemblies of the type contemplated herein are disclosed in more detail in the copending application of William C. Harmon, Ser. No. 462,907 filed June 10, 1965 and entitled "Method and Apparatus for Inspecting Metallic Objects," now Pat. No. 3,497,799, the disclosure of which is hereby incorporated herein by reference. Leads 176, 177 extend from each twin search-coil assembly 110, 111 through the housing 156 and are connected with a signalling circuit, shown in block diagram in FIG. 15, to be described subsequently. A protective facing, such as a nylon insert 179, 180 is positioned directly beneath each pair of twin search-coils. The facing spaces the search coils a predetermined distance from the surface of the billet being inspected and also provides a surface of relatively low friction for riding upon the surface of the billet during the inspection. Excessive wear of the facing is prevented by wear plates 181, 182 that encircle the twin search-coils and the nylon inserts.

The two proximity coils 112, 113 (see FIG. 9) are carried within the housing 156, adjacent the bottom surface thereof along one longitudinally extending side that is adjacent the arm 144 of the mounting bracket 136. Each proximity coil 112, 113 is mounted in a pivoted arm 184, 185, respectively. The arms 184, 185 pivot about a common mounting shaft 188 that extends transversely of the housing 156, in general alignment with the two search coil assemblies 110, 111. The arm 184 extends forwardly of the mounting shaft 188, and the arm 185 extends rearwardly. The proximity coils 112, 113 extend upward from the mounting arms 184, 185, through enlarged apertures 190, 192 in the housing 156. The enlarged size of the apertures 190, 192 permits the pivoted arms 184, 185 to rotate through a relatively small arc about the mounting shaft 188. Spring plungers 194, 195 are secured in the housing 156 and cooperate with the distal ends of the pivoted arms 184, 185, respectively. Thus, the proximity coils 112, 113 are resiliently biased against the surface of the billet being scanned by the housing 156 and, to a limited degree, follow the surface contour of the billet independently of the housing. This prevents the proximity coils from disturbing the search coils in response to surface irregularities that are beneath the proximity coils but not beneath the search coils. The lower end of each proximity coil 112, 113 is positioned at the lower surface of the pivoted arms 184, 185, and the coils are electrically connected with a proximity sensing system to be described in more detail below. With this arrangement, a proximity coil is positioned in advance of and to the rear of the twin search coil assemblies 110, 111 during reciprocation of the scanning unit 165. Thus, in either direction of reciprocation of the scanning unit, one of the proximity coils 112, 113 will be moved beyond the longitudinally extending edge of a billet before the search coils themselves reach the edge. This provides a signal that reverses the control valve 126 to reverse the direction of movement of the scanning unit.

Two nozzles or paint markers 114, 115 are carried by the scanning unit 105 adjacent the opposite side of the housing 156 from the proximity coils 112, 113. See FIGS. 5 and 7. The paint markers 114, 115 are positioned to direct a spray of paint to a localized area on the billet being inspected. As with the proximity coils, one paint marker is located on either side of the axis of alignment of the twin search-coil assemblies 110, 111, so that one of the markers will follow the search coils in each direction of reciprocation, in a manner similar to the way in which one proximity coil leads the search coils during reciprocation. Depending upon the direction in which the search coils are being reciprocated, one of the paint markers 114, 115 (i.e., the one following the search coils in the direction of movement) will be actuated after a short delay each time the search coils detect a defect. The construction and operation of the paint spray guns will become better understood in Part III hereof. In addition, suitable paint spray apparatus for use with this invention is disclosed and claimed in the copending application of Joseph M. Mandula et al., Ser. No. 287,987, filed June 14, 1963, now Pat. No. 3,418,567 and entitled "High Speed Marking System," the disclosure of which is hereby incorporated herein by reference.

(C) Calibrating mechanism

Reference is now made to FIGS. 3 and 4, where the inspection station 22 is shown, with parts removed, showing the construction and arrangement of the calibrating mechanism. A path of travel $P_2$ is indicated by a dot-dash line extending between the two spaced conveying rolls 24, 25 and is positioned along the axis corresponding to the center line of a three inch square billet. The center lines of the scanning units 45, 46 are indicated at CL, CL' respectively. A calibrating bar 205 is located between the two conveying rolls 24, 25, aligned with the path of travel $P_2$ of the billet. The calibrating bar 205 is shown in solid line in a lowered position beneath the path of billet travel and in phantom lines in a raised position coincident with the path of billet travel. A frame 208 provides a support for the calibrating bar 205. The calibrating bar 205 is connected to the frame 208 by a pair of links at each end of the bar 205. A first pair of links 210 are pivotally connected between a depending lug 212 at one end of the bar 205 and an upstanding lug 215 on the frame 208. Similarly, the opposite end of the calibrating bar 205 is pivotally connected by a pair of links 218 between a depending lug 219 on the bar 205 and an upstanding lug 221 on the base 208.

A third depending lug 225 is located on the calibrating bar 205 mid-way between the two lugs 212, 219. A clevis 228 pivotally connects this lug with a piston rod 230 of a pneumatic cylinder 231. The pneumatic cylinder is connected at a central pivot 233 to the supporting frame 208.

With the above construction, air supplied to the cylinder 231 raises or lowers the calibrating bar 205. The bar swings between the lower and upper position on the links 210 and 218. The calibrating bar is maintained in its lower position when a billet is being inspected. In the absence of a billet, the calibrating bar may be raised by the actuation of pneumatic cylinder 231 to a position normally occupied by a billet. With the calibrating bar in raised position, the two inspection assemblies 45, 46 may be lowered into an inspection position relative to the calibrating bar 205, and the scanning units may be adjusted to a desired sensitivity in accordance with a known defect present in the calibrating bar. The manner of controlling and actuating the pneumatic cylinder for raising and lowering the calibrating bar will be explained in more detail in Part III.

(III) CONTROL SYSTEMS

The general mechanical arrangement just described is automatically operated by electrical, hydraulic and pneumatic control systems. An overall electrical control circuit for automatic operation and for calibrating the scanning units is provided. Additional electrical circuits include a proximity sensing system with two transducer coils for sensing the edges of the billet being inspected, and also a signalling circuit for detecting defects present in the billet being inspected and for actuating defect markers. The hydraulic control system is actuated in response to the electrical controls and moves the support arms and scanning units to different positions at controlled speeds during an operating cycle. The pneumatic system moves the search coils into an out of proximity with the billet being scanned, raises the calibrating bar, and also controls and operates the paint markers for marking defects on the billet. The circuits and systems will be described in connection with a single inspection station and single scanning unit unless otherwise indicated, since all operate in the same manner. All contacts in the control systems that are operated by a coil relay are designated by the same reference character as the relay, plus a numerical suffix to distinguish any one such contact from another.

(A) Electrical control system

Figure 12:
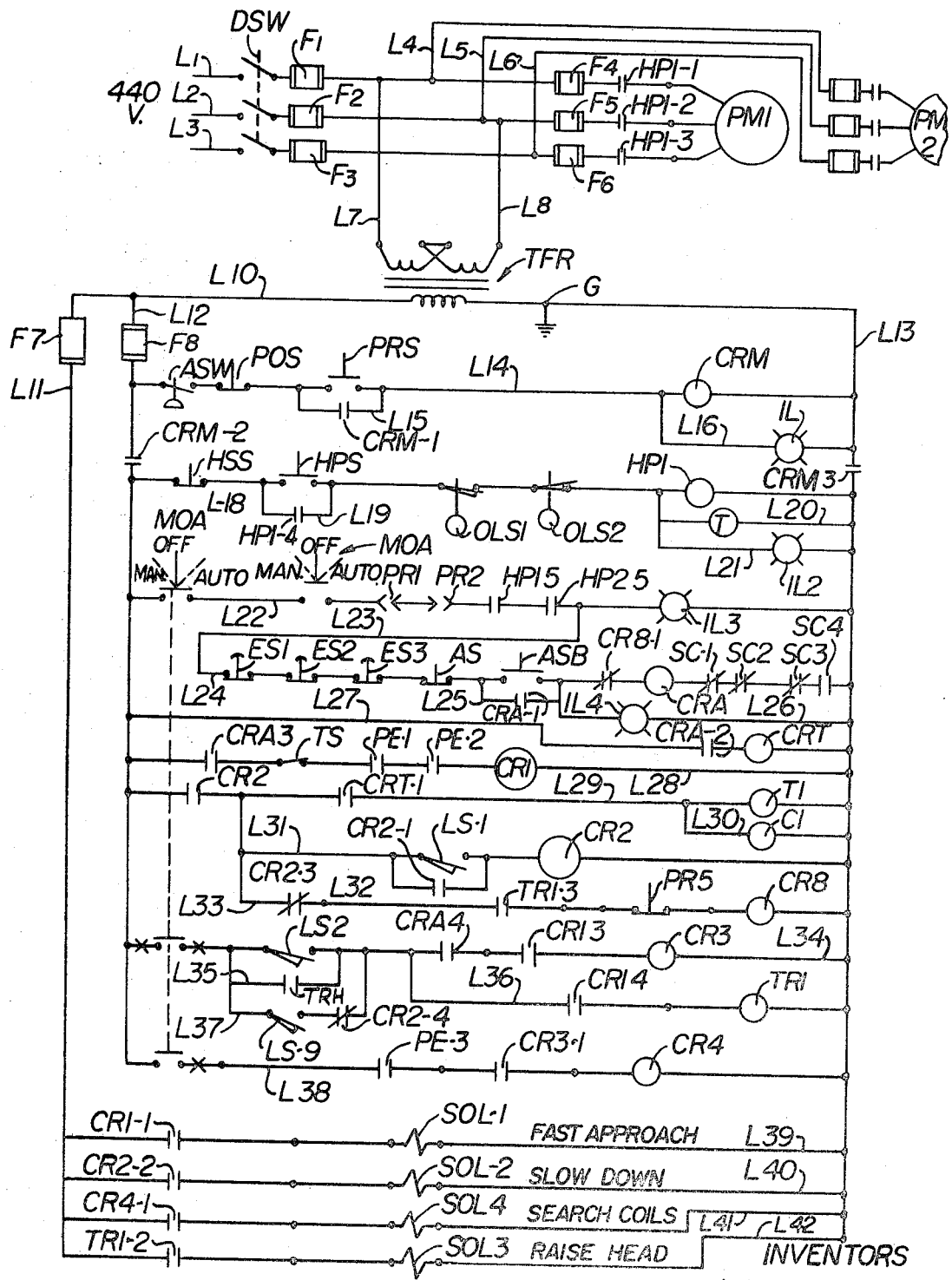
FIG. 12 is a wiring diagram of the control circuit for operating an inspecting station, including raising and lowering the scanning unit and search coils relative to a billet.

The main electrical control circuit is schematically shown in FIG. 12. Three power lines L1, L2, L3 are supplied with 440 volt alternating current. Each line includes one contact of a disconnect switch DSW and two fuses F1, F4; F2, F5; and F3, F6. A normally open contact HP1–1, HP1–2, and HP1–3, respectively, is located in each line L1, L2, L3 between the fuses F4, F5, F6 and a pump motor PM1. The pump motor PM1 supplies power to the hydraulic pumps of one inspection station, e.g., inspection station 22. Power lines L4, L5, L6, connected respectively with lines L1, L2, L3, supply power to a second pump motor PM2 for the other inspection station. The primary winding of a three kva. transformer TFR is connected by lines L7, L8 to power lines L1, L2, respectively. The secondary of the transformer is in an electrical line L10 of the control circuit.

(1) *Supplying power.*—When the disconnect switch DSW is closed to the "on" position, 440 volt current is supplied to one side of the contacts HP1–1, 2, 3. These contacts, when closed, will start the pump motor PM1. Current is also introduced to the primary of transformer TFR, which reduces the voltage from 440 across the primary to 110 volts across the secondary, in line L10. As shown in the schematic ladder diagram of the control circuit, line L10 is connected across lines L11, L12, and L13 and is grounded at G. Line L11 contains a fuse F7 and line L12 contains a fuse F8. Lines L14 through L38 extend across lines L12 and L13, and lines L39 through L42 extend across lines L11 and L13.

A mechanical air-pressure switch ASW, a power off switch POS, a power on reset switch PRS and a power control relay CRM are connected in series in line L14. The air pressure switch ASW is set to only close when the air pressure in the pneumatic system is 60 pounds per square inch (p.s.i.) or above to provide protection for the unit, since many parts of the system operate only on air pressure from 60 to 70 p.s.i.

With the power off switch POS in its normally closed position, the closing of the power on reset switch PRS energizes the power control relay CRM and also the indicator lamp IL in line L16. Energization of the relay CRM closes normally open contacts CRM–1 in line L15 and normally open contacts CRM–2 and CRM–3 in lines L12 and L13, respectively. Contact CRM–1 establishes a holding circuit for relay CRM, and contacts CRM–2, 3 connect the remainder of the control circuit between lines L12 and L13 with power line L10.

(2) *Starting pump motors.*—Each hydraulic pump motor PM1 and PM2 operates two pumps. PM1 operates pumps for the two scanning heads for one inspection station and PM2 operates the pumps for the scanning heads of the other inspection station. Each pumping unit has a 90 gallon tank and is equipped with mechanical oil level switches OLS1 and OLS2. The purposes of these switches is to stop the pump automatically if the oil level is too low or too high. When the oil level is at the proper height, hydraulic pump motor PM1 is started by pressing the start switch HPS in line L18. This completes a circuit through a normally closed hydraulic stop switch HSS, the now closed start switch HPS, and the closed oil level switches OLS1, and OLS2 to energize a hydraulic pump relay HP1. Energization of relay HP1 closes normally open contacts HP1–1, 2, 3, thereby connecting the hydraulic pump motor PM1 to the source of power. Normally open contact HP1–4 in line L19 is closed, establishing a holding circuit for relay coil HP1 and contact HP1–5 in line L22 is also closed. At the same time relay coil HP1 is energized, a timer T in line L20 is energized to record the running time of the pumps. A pump indicator light IL2 in line L21 is also turned on to indicate that the pump PM1 is running. The operation for starting pump PM2 is identical.

Figure 13:
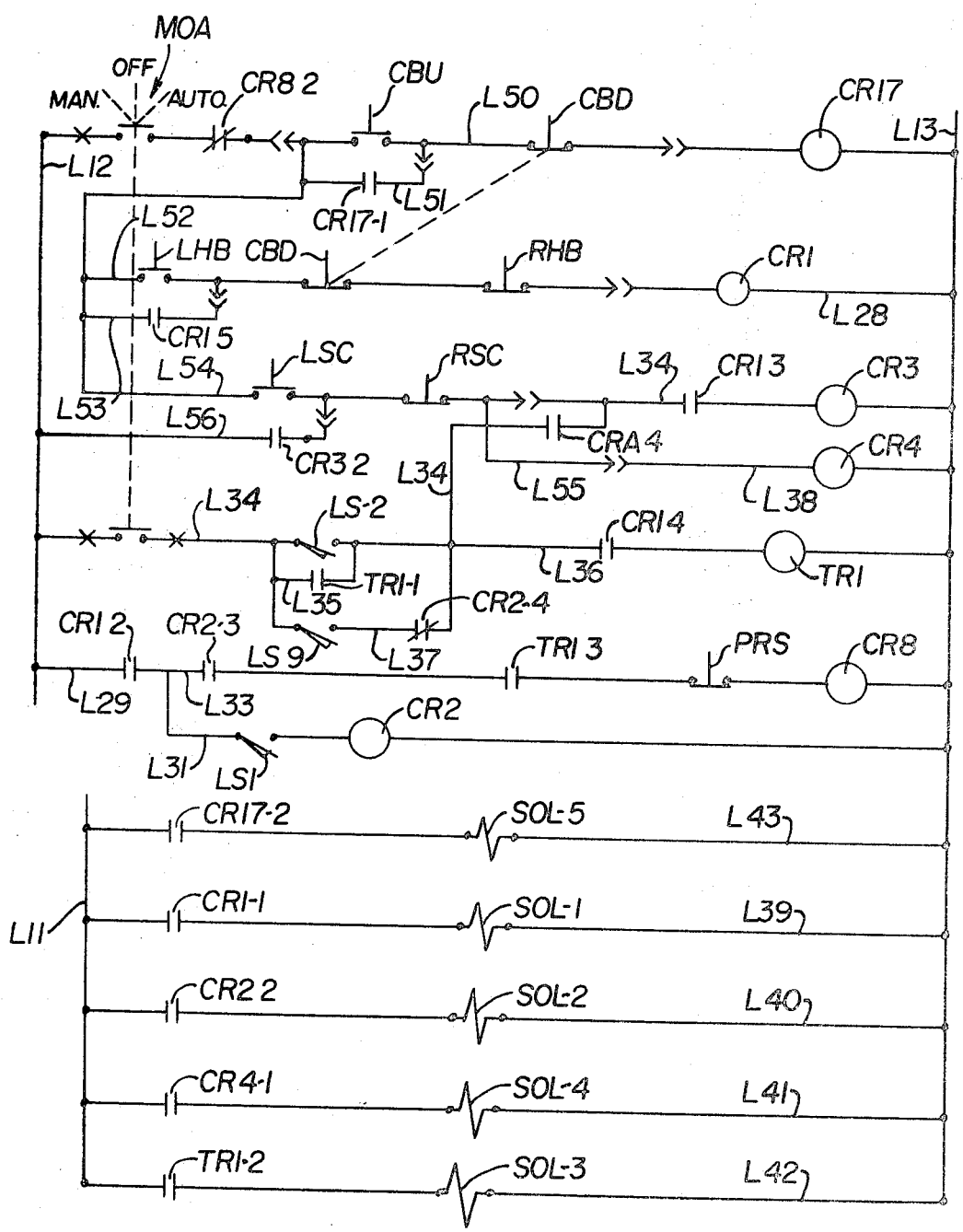
FIG. 13 is a wiring diagram of the calibration control circuit associated with the control circuit of FIG. 12, for raising and lowering the calibration bar and for controlling the operation of the scanning unit during calibration.

(3) *Activating the automatic control.*—A Manual-Off-Automatic switch MOA having three positions and several sets of contacts is provided, with contacts in lines L22, L34 and L38 of FIG. 12, as well as in line L50 of the circuit of FIG. 13. An *x* on the line of the circuit to the side of the contact of the three position switch indicates the position in which the switch is operational. A second three position Manual-Off-Automatic switch MOA2 is in line L22. Both switches must be in automatic position for automatic operation. A pendant, which is a portable pushbutton station used for calibrating the scanning heads, connects to line L22 at receptacles PR1 and PR2. The pendant must be plugged into the control circuit to complete the circuit of line L22 for automatic operation. With both switches MOA and MOA2 in automatic position and with the pendant connected, a circuit is provided through the two switches, the pendant receptacles, closed contacts HP1–5 and HP2–5 (which was closed in the same manner as HP1–5 by the energization of hydraulic power motor PM2) and the "ready to run" light IL3 is on.

At the same time, current is introduced to one side of an automatic start button ASB through lines L23, L24, three normally closed emergency stop buttons ES1, ES2, ES3, and a normally closed automatic stop button AS. On the other side of the automatic start button ASB, completing the circuit of line L24, are a normally closed contact CR8–1, a relay coil CRA and four safety relay contacts SC1, SC2, SC3, and SC4. These safety relay contacts are in the photoelectric units and are closed when the units are operating properly. Pressing the automatic start button ASB energizes relay CRA through the circuit of line L24, thereby closing contacts CRA–1 in line L25 to establish a holding circuit and to energize the "automatic" indicator light IL4 in line L26. Relay coil CRA also closes contacts CRA–2 in line L27, energizing coil CRT to set up a circuit in line L29 by closing contacts CRT–1 which will subsequently make available a timer and counter T1 and C1 to record "scanning time" and "raise" and "lower" cycles of the scanning head. The scanning units are now ready for automatic operation.

(4) *Lowering scanning head onto billet.*—There are three photocells associated with each scanning head. Photocells 60, 61 and 62 associated with scanning assembly 45 have been previously described. The photocells have, respectively, contacts PE–1, PE–2, in line L28, and PE–3 in line L38.

The energization of coil relay CRA, previously described, closes contacts CRA–3 in line L28, supplying current to one side of the photoelectric cell contact PE–1 via normally closed toggle switch TS. The toggle switch TS allows one head to be raised while the other heads are in automatic operation.

The front of the approaching billet intercepts the beam on the first photocell, closing contacts PE–1. Further movement of the billet breaks the beam on the second photocell, closing contact PE–2 in series with contacts CRA–3, PE–1 and toggle switch TS. The two photocell contacts provide a safety feature in the event one is closed by a false signal. This energizes a coil relay CR1 in line L28. This closes normally open contacts CR1–1 in line L39, energizing a fast approach solenoid SOL–1. The fast approach solenoid controls a valve in the hydraulic system shown in FIG. 16 which actuates the hydraulic cylinder 86 that controls the raising and lowering of the support arm 49 for the scanning unit. The energization of solenoid SOL–1 starts the scanning head moving toward the billet.

At the same time, contacts CR1–2 in line L29 are also closed. This completes a circuit through now closed contacts CRT–1 to start the timer T1 in line L29 and the counter C1 in line L30, which record the scanning time and raise, lower cycles.

As the scanning head nears the billet, the sensing roller 103 and lever arm 104 activate a limit switch LS–1, shown with the contact in line L31, energizing coil relay CR2.

This closes contacts CR2-1 completing a holding circuit across the limit switch LS1, assuring that the coil relay CR2 will remain energized. Contacts CR2-2 in line L40 are also closed, thereby energizing a "slow-down" solenoid SOL-2. This solenoid actuates a valve in the hydraulic system, which controls the movement of the head toward the billet. The movement is restricted so the head does not impact against the billet with a large force. At the same time, normally closed contacts CR2-3 in line L33 are opened, preventing relay CR8 from subsequently becoming energized.

As the scanning head contacts the billet with roller 99, a second mechanical limit switch LS2 with contacts shown in line 34 is activated by the same cam lever arm 104. This energizes coil relay CR3 in line L34 by completing a circuit through a contact of the switch MOA, and the now closed contacts CRA-4 and CR1-3, which were closed when their associated relays were activated. This also completes a circuit through now closed contacts CR1-4 in line L36, energizing time-delay relay coil TR1. When coil TR1 is energized, contacts TR1-1 in line L35 are closed, establishing a holding circuit across the limit switch LS-2. Contacts TR1-2 in line L42 are also closed, energizing the "raise head" solenoid SOL-3. This serves to reduce the contact pressure of the scanning head on the billet during scanning. The scanning head is not raised from contact with the billet at this time due to the construction of the hydraulic cylinder in the hydraulic system, which will be explained subsequently. The contacts TR1-3 in line L33 are also closed, but contacts CR2-3 have previously been opened. It will be apparent from the circuit that when relay CR8 is energized, relay CRA drops out, and the automatic operation is prevented.

The continued movement of the billet intercepts the light beam of the third photocell, closing the contacts PE-3 in line L38. This completes a circuit in line L38, through the closed contact of the switch MOA, the closed contacts PE-3, the closed contacts CR3-1 (which were closed when relay coil CR3 in line L34 was energized) thereby energizing the relay coil CR4. Relay coil CR4 closes contacts CR4-1 in line L41, energizing a solenoid SOL-4, which activates the air cylinder 116 that lowers the scanning coils to the billet.

The scanning now begins, and will be described in detail in connection with the proximity sensing system and the hydraulic system.

(5) Safety limit switch.—A safety limit switch LS-9 is provided making contact in line L37 and actuated by the support arm 49 that mounts the scanning unit. The purpose of this switch is to guard against a premature energization of coil relay CR1.

Coil relay CR1 initiates the fast approach of the support arm toward the billet. If a billet is not present, movement of the arm 49 closes limit switch LS-9. When this happens, relay TR1 is energized through the three positions which MOA, the limit switch LS-9, the normally closed contacts CR2-4 in line L37, and the now closed contacts CR1-4 in line L36. Energization of relay TR1 closes contacts TR1-3 in line L33, completing a circuit of line L33 through the normally closed contacts CR2-3, the closed photoelectric reset switch PRS to energize relay coil CR8. When CR8 is energized, the normally closed contacts CR8-1 in line L24 are opened and relay coil CRA is de-energized. This opens contacts CRA-3 in the circuit of coil CR1, line L28, thereby de-energizing CR1. The fast approach of arm 70 then stops. Contacts CR1-4 in line L36 open, to de-energize coil TR1. However, TR1 is a time delay relay which holds in from one to two seconds after it is de-energized. As a result, the "raise head" solenoid SOL-3 is energized even after the fast approach solenoid SOL-1 is de-energized as a result of coil relay CR1 dropping out. This reverses the movement of the arm and the scanning head returns to raised position. With this arrangement, the scanning head is protected against being hit by a billet, should the scanning head come down before the billet is in position.

(6) Calibration.—Reference is now made to the calibration circuit schematically shown in FIG. 13. Portions of this circuit coincide with portions of the control circuit of FIG. 12 and these parts are indicated by like reference numerals. Where circuit lines of this diagram coincide only in part with lines of the control circuit of FIG. 12, a dot is provided on the line indicating the juncture of a new line and the discontinuation of the indicated line on one side of the dot, which coincides with the line of the control circuit diagram.

A pendant or portable pushbutton station may be plugged into a receptacle associated with each scanning head to calibrate each head individually. The pendant has the following six control buttons:

Calibration bar up
Calibration bar down
Lower head
Raise head
Lower search coils
Raise search coils When the pendant is plugged in, all pendant receptacles marked schematically by chevrons in the control circuit and calibration circuit are closed to complete the applicable circuit.

Before starting calibration the three position switch MOA is placed in the manual position. By pressing a "calibration bar up" switch CBU a circuit is completed along line L50, through the switch MOA, the normally closed contact CR8-2, and a closed calibration-bar-down switch CBD to energize a coil relay CR17. This closes contacts CR17-1 in line L51 establishing a holding circuit across the switch CBU. Coil relay CR17 also closes contacts CR17-2 in line L43, thereby energizing a calibration bar solenoid SOL-5. This causes the calibration bar 205 to be raised into calibrating position by the pneumatic cylinder 231.

A "lower head" button LHB in line L52 is then pressed, establishing a circuit through a second set of contacts CBD' of the calibration bar down switch CBD, a closed "raise head" button RHB to energize coil relay CR1 in connected line L28. Energization of coil relay CR1 closes contacts CR1-5 in line L53, establishing a holding circuit across the button LHB. Contacts CR1-1 in line L39 are also closed, energizing the fast approach solenoid SOL-1 causing the arm 70 and scanning head to rapidly approach the calibrating bar. The energizing of the fast approach solenoid SOL-1 and also the slow down solenoid SOL-2 (through contacts CR1-2 and limit switch LS-1 in lines L29 and L31) is the same as explained in the automatic scanning operation, with the exception that activating limit switch LS-2 does not lower the search coils automatically.

The normally open contacts CRA-4 in line L34 close only when the unit is set for automatic operation, thus preventing coil relays CR3 and CR4 from being energized. This gives the operator separate control over the lowering of the head and lowering the search coils.

The search coils are lowered by pressing the "lower search coil" button LSC in line L54 to complete a circuit through the closed "raise search coil" button RSC and the now closed contacts CR1-3 to energize coil relay CR3 in line L34 and to also energize coil relay CR4 in line L38 via line L55. This closes contacts CR3-2 in line L56 to hold relays CR3 and CR4 energized. At the same time, contacts CR4-1 in line L41 are closed, energizing the search coils solenoid SOL-4. This lowers the search coils to the calibrating bar. Scanning now begins and the sensitivity of the electronic equipment is set to the required standards. It is essential that the calibrating bar be positioned in an operative position so that the scanning units can move across the bar during calibration. Otherwise the signalling circuit cancels the defect reading and proper adjustments cannot be made.

When the calibration is completed, the calibrating bar is lowered and the scanning head is raised. This is accomplished by pressing the "calibration bar down" button CBD in line L50, which also actuates the button SBD' in line L52, as indicated by the dotted line. This de-energizes relays CR17 and CR1. As a result, contacts CR17-2 in line L43 are opened, de-energizing the calibration bar solenoid SOL-5, and the calibration bar is lowered. The de-energization of the relay CR1 opens the associated contacts, thereby de-energizing coil relays CR2, CR3, and TR1. The de-energizing of CR3 then de-energizes relay CR4 by releasing the hold circuit of line L56. As already mentioned, relay TR1 is a time delay relay which stays energized long enough to permit the hydraulic system to raise the scanning heads from operating position.

It will be apparent that the "raise search coils," "raise head" and "calibration bar down" buttons can be operated individually if need be. The operation of the safety limit switch LS-9 is the same as described in the automatic operation.

(7) *The proximity sensing system.*—The direction of movement of the scanning unit 105 is controlled by the valve 126. In turn, the valve is controlled by the proximity sensing system, which senses the edge of the billet being scanned and shifts the valve, reversing the direction of movement of the scanning unit. The two proximity coils or transducer coils 112, 113 and a shielded cable associated with each, provide the necessary inductance-capacitance ratio for the resonant circuit of a conventional Hartly Electron-Coupled Oscillator, which oscillates at a frequency of 450 kc. The proximity circuit is shown diagrammatically in FIG. 14.

Figure 14:
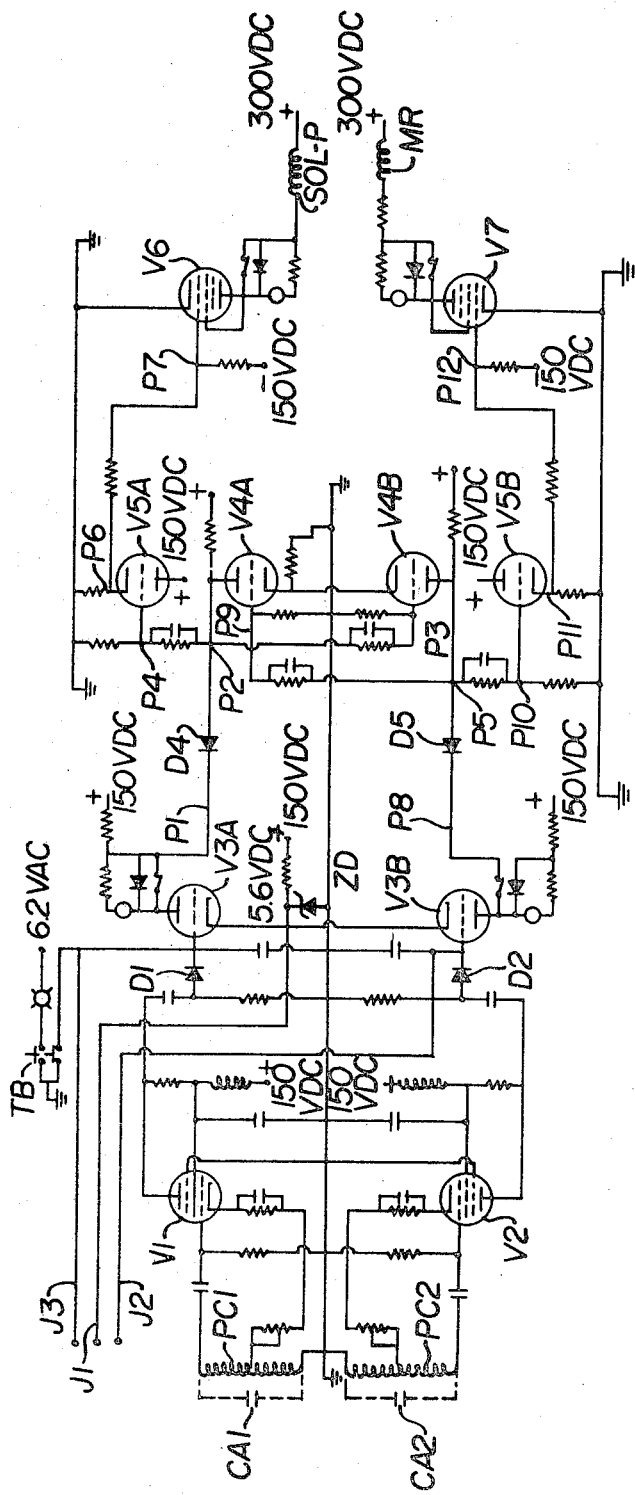
FIG. 14 is a wiring diagram of a circuit associated with the proximity coils of a scanning head for controlling the reciprocation of the scanning unit across the surface of a billet being inspected and for selecting the proper defect marker to be actuated during the reciprocation of the scanning unit.

Two proximity coils PC1 and PC2 are shown in FIG. 14, each having its own oscillator V1 and V2, respectively, the capacitance of the cable for each coil is shown in phantom at CA1 and CA2. Briefly, the output of these two oscillators is capacitive coupled through germanium diodes D1 and D2, respectively, to the grids of vacuum tubes V3A and V3B, respectively, causing the tubes to conduct current.

As tubes V3A and V3B start to conduct, the plate voltages drop from 135 volts to 55 volts. This voltage is diode coupled through diodes D4 and D5 to the plates of tubes V4A and V4B, then through a voltage dividing network to the grids of tubes V5A and V5B. The output of tubes V5A and V5B is coupled to tubes V6 and V7, respectively, through a voltage divider network, which is returned to the negative 150 volt power supply. The voltage divider network maintains a negative voltage of 37 volts on the grids of tubes V6 and V7 and biases them into cut-off.

The proximity coils PC1 and PC2 oscillate when they are not adjacent the metal billet and cease to oscillate when they sense the metal. When the scanning head comes down on a billet, the top proximity coil PC1 is positioned to sense the metal billet. At this time, oscillation ceases and there is no output from the tube V1. This means that no signal is being fed to the grid of the tube V3A. Without this signal, the voltage normally set up by a Zener diode ZD biases the tube V3A into cut-off. When this happens, the voltage at point P1 rises from 55 volts to 135 volts. This allows the voltage at point P2 to also rise to 135 volts. This increase in voltage also increases the voltage at points P3 and P4.

The voltage increase at point P3 causes tube V4B to conduct heavily, decreasing the voltage at point P5 and reverse biasing diode D5.

The voltage increase at point P4 causes tube V5A to conduct, increasing the voltage at point P6. This increased voltage at point P6 then overcomes a negative 37 volts that exists at point P7 when no metal is sensed by the proximity coil PC1, causing the tube V6 to conduct.

When tube V6 starts to conduct, it energizes a solenoid SOL-P, which operates the control valve 126, starting the scanning assembly to move in an upward direction.

As the scanning assembly moves upward across the surface of the billet, the bottom proximity coil comes into overlying relationship with the billet and senses the metal. This stops the oscillation of tube V2.

There is now no output from the tube V2 and, therefore, no signal is being fed to the grid of tube V3B. The voltage at point P8 now rises to 135 volts, but diode D5 cannot conduct current because of the low voltage at point P5. This low voltage at point P5 is caused by the heavy current being conducted by tube V4B. This effect is called the "reverse biasing" of diode D5.

The scanning assembly continues in its movement upward across the surface of the billet until the top proximity coil PC1 passes beyond the top edge of the billet. At this time, the coil no longer senses metal and tube V1 starts to oscillate.

The output of tube V1 to the grid of tube V3A again causes V3A to conduct. Point P1 now falls to 55 volts and point P2 also drops to the same voltage. Point P4 also has decreased voltage, causing point P6 to decrease in voltage also. There is now insufficient voltage to overcome the negative voltage (minus 37 volts) at point P7 and tube V6 is now cut-off. This de-energizes the valve solenoid SOL-P, reversing the control valve 126 and the scanning assembly starts to move downward.

At the same time the scanning assembly movement reverses, the voltage at point P3 also decreases, causing the voltage at point P5 to increase. Diode D5, then, is no longer reversed biased and the voltage increases to 135 volts, the same voltage as at point P8. This voltage increase also occurs then at points P9 and P10.

When the voltage at point P10 increases, it causes tube V5B to conduct heavily, and this increases the voltage at point P11. This increased voltage then overcomes a negative 37 volts that exists at point P12 of tube V7 when no metal is sensed by the proximity coil PC2, causing V7 to conduct. The conducting of tube V7 energizes a relay MR, which reverses the operation of the defect markers 114, 115 for the downward scanning movement. The operation of the markers will be described below.

The increasing voltage at point P9 causes the tube V4A to conduct heavily, decreasing the voltage at point P2. This then, puts a reverse bias on diode D4.

As the top proximity coil PC1 then comes back over the billet, tube V1 will stop oscillating and the voltage at point P1 will again increase to 135 volts. However, the lower voltage at point P2 stops diode D4 from conducting, thereby preventing the control valve solenoid SOL-P from being energized while the scanning assembly is in its downward movement. The scanning assembly continues its downward motion until the bottom proximity coil goes past the bottom edge of the billet and tube V2 goes into oscillation. The cycle then repeats itself.

The scanning test button TB and leads J1, J2, and J3, adapted to be connected to a volt meter, are provided to facilitate the adjustment and testing of the proximity circuit.

Figure 15:
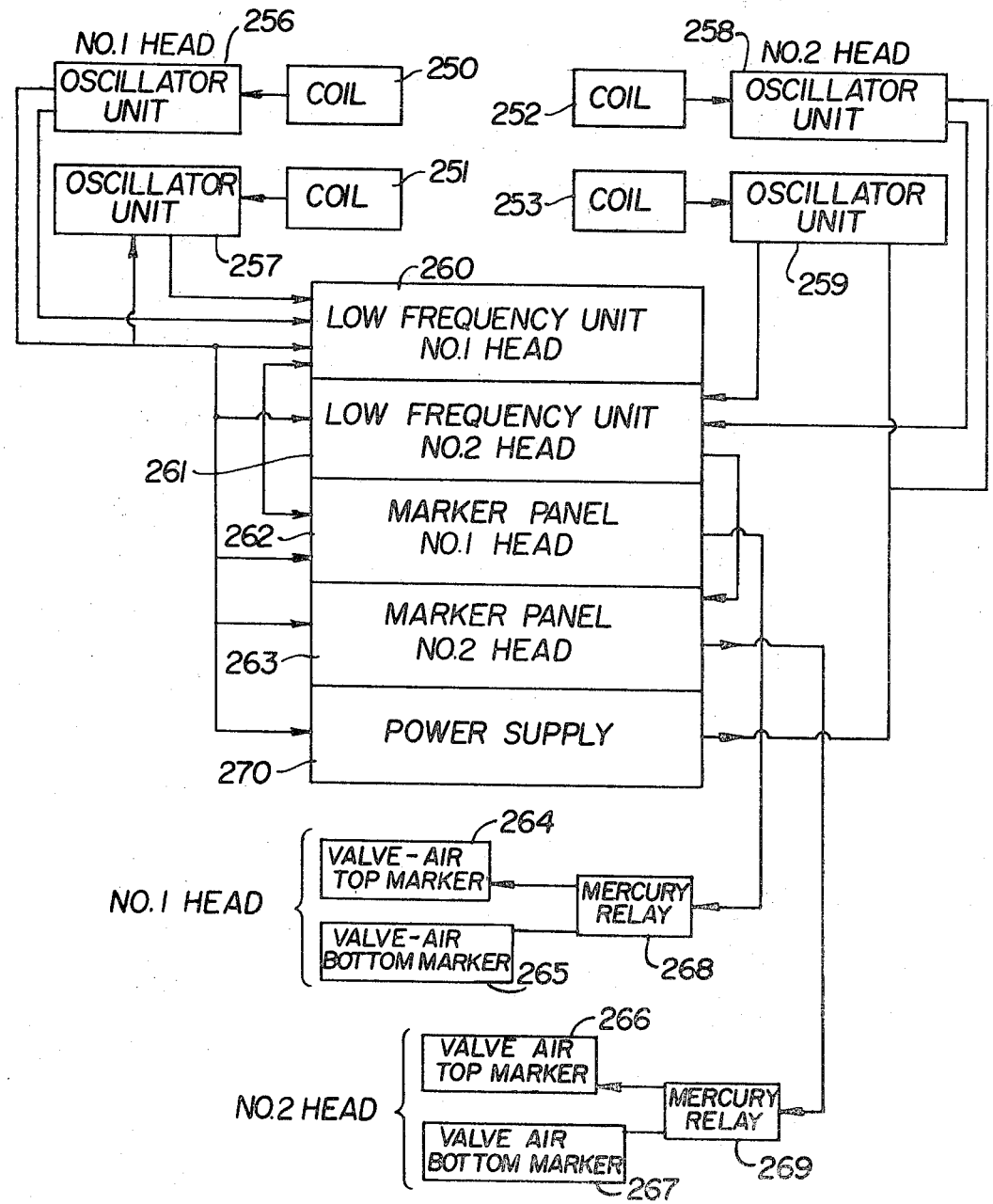
FIG. 15 is a block diagram of a signalling circuit illustrating the manner in which the sensing coils produce signals which trigger the defect markers to indicate the presence of a defect directly upon the billet.

(8) *Signalling circuit.*—The manner in which the twin search coils of each scanning unit or head operate can be best understood from the diagrammatic block diagram of FIG. 15. A detailed description of the coils is disclosed in the said application Ser. No. 462,907. Two scanning assemblies of one inspection station are represented, and indicated as No. 1 head and No. 2 head. Boxes 250 and 251 represent the coils associated with the No. 1 head and boxes 252 and 253 represent the coils associated with No. 2 head. These boxes 250, 251 correspond with the coils 110, 111 shown structurally in FIG.

15. Each coil is a double winding, balanced electrically to zero output, with a total resistance of approximately 1800 ohms. Each scanning assembly contains two of these twin coils, and each twin coil has its own oscillator unit, indicated at 256, 257, 258 and 259 in FIG. 11.

The signals from the twin coils of each head are fed to a separate low frequency unit 260, 261 associated with each head. Electronically, each low frequency unit consist of two identical circuits, the outputs of which are coupled into one and then fed into an associated marker panel 262, 253.

The marker panels 262, 263 take the signals from the low frequency units and activate air valves, indicated by boxes 264–267, that control the defect markers. Boxes 264, 265 correspond to valves 340, 341 of the pneumatic system shown in FIG. 17. This pneumatic system will be described subsequently. The output from each marker panel is connected with a relay indicated by the box 268, 269. Box 268 corresponds to the relay MR in the proximity circuit of FIG. 14. The relay determines which defect marker of the associated scanning head will be actuated when a defect is sensed. The bottom marker is actuated on the upward stroke of each scanning unit and the top marker on the downward stroke. A short time elapses from the instant the scanning coil receives a signal from a defect and the actual time that the marker is actuated. The markers are off-set approximately 9/16 of an inch from the center line of the scanning coil to compensate for this. In this way, the markers spray paint directly on the defect of the billet.

A single power supply 270 supplies power to the components of the signalling circuit of both scanning heads. This arrangement for the No. 3 and No. 4 heads of the second inspection station is identical.

It is contemplated that defect signals from the twin coils may be used to actuate markers other than paint markers that mark the actual defect. For example, the defect signals may be used to make a secondary record, such as a magnetic or punched tape or card or other memory device to indicate the presence and location of the defect. Such tape, card or memory device may then be used to subsequently control a marking device or may be used to control an automatic scarfing apparatus to remove the defect from the proper location on the billet.

(B) Hydraulic system

Figure 16:
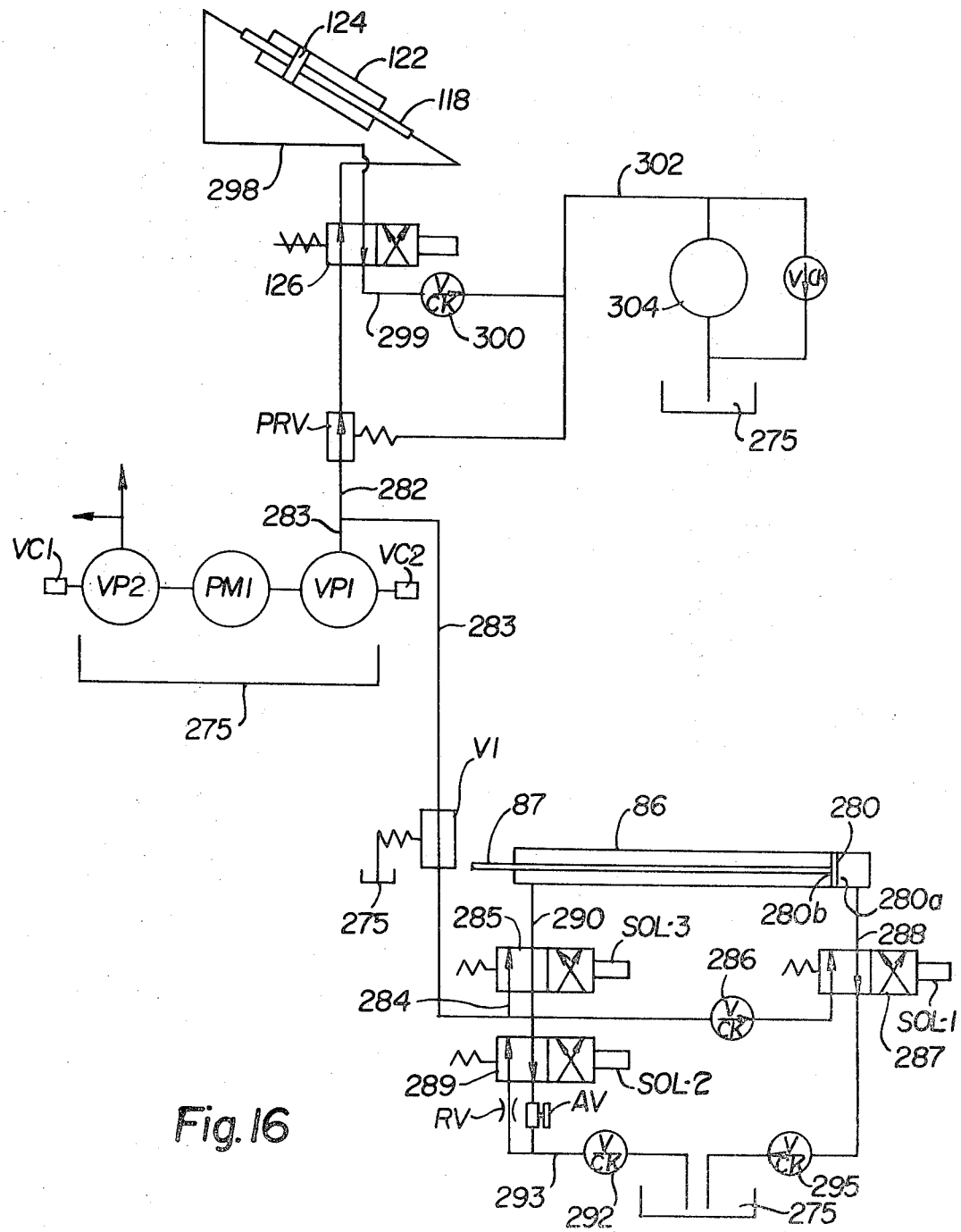
FIG. 16 is a diagrammatic layout of the hydraulic system for raising and lowering the scanning units and for reciprocating the scanning units across the surface of the billet being inspected.

Movement of the support arms and oscillation of the scanning unit is provided through a hydraulic system diagrammatically shown in FIG. 16. As was previously mentioned in connection with the electrical control system, a hydraulic pump is provided for each scanning head. Pumps for the two scanning heads of one inspection station are shown at VP1 and VP2 in FIGS. 2 and 16. These two pumps are driven by a single electric motor PM1, which is also shown in the control circuit of FIG. 12. Because the equipment and circuits for each scanning head are identical, a description of the hydraulic system of only one scanning head will be presented in detail.

The two pumps VP1, VP2 are variable volume pumps. That is, the volume of hydraulic fluid pumped may be changed, but the pressure will remain the same. The volume of each pump may be controlled by a manual volume control VC1 and VC2. The volume of hydraulic fluid pumped determines the speed at which the billet is scanned by the scanning unit. The speed at which the scanning unit oscillates is selected to provide an adequate coverage of the billet surface in a zigzag scanning path across the billet as the billet moves longitudinally. An example of a suitable scanning path is shown in FIG. 18. The precise path of scanning is a function of the speed and cycle time of the scanning unit oscillation, the longitudinal speed of the billet, and the spacing of the coils.

A tank 275 provides hydraulic fluid to the pumps. The pump VP1 is shown connected to two hydraulic cylinders. One of the cylinders 86 is the cylinder 86 of FIG. 2 of the drawings, which raises and lowers the support arm 49 and the scanning unit 105 to move the unit toward and away from the billet. The other cylinder 122 is the movable scanning cylinder shown in FIG. 6 of the drawings, which oscillates the scanning unit across the surface of the billet when hydraulic fluid is introduced through the cylinder rod 118 to either side of the fixed piston 124, as already described.

(1) Operation of the raise and lower cylinder.—The cylinder 86 has a piston 280 connected to the piston rod 87. The piston 280 has two sides 280a and 280b. The diameter of the piston rod 87 subtracts from the effective area of surface 280b. The piston and rod are so constructed and arranged that the effective area 280a is twice that of 280b. This provides the cylinder with a two to one ratio, so that the piston will move in the direction of side 280b when equal pressure is supplied to both sides of the piston. However, the rate of movement and the force will be reduced from that when hydraulic fluid is supplied to only one side of the piston.

From the output of pump VP1, hydraulic fluid under pressure is supplied through conduits 282 and 283 to a regulating valve V1. Valve V1 is adjusted for a desired pressure output, and the excess hydraulic fluid is fed back to the tank 275. By way of example, the output of pump VP1 may be 1500 p.s.i. and the valve of V1 may be adjusted for a 500 p.s.i. output. The output from valve V1 is introduced through conduit 284 to a blocked port of the valve 285 operated by solenoid SOL-3, which controls the raising of the scanning head. Fluid pressure is also introduced through a check valve 286 in conduit 283 to a blocked port of a valve 287 operated by solenoid SOL-1, which controls the fast approach of the scanning head toward the billet. Therefore, at the present time, the flow of oil is blocked. The check valves in this system are used to keep the oil from draining back to the storage tank 275, making the system faster acting.

As already described in connection with the control circuit of FIG. 12, when the billet to be inspected blocked the light beam on the photoelectric cells 60, 61 contacts PE-1 and PE-2 were closed, energizing coil relay CR1 which, in turn, energized the fast approach solenoid SOL-1. After this occurs, the right side of the valve 287, as diagrammatically shown in FIG. 16, shifts over to the left position. This now allows the hydraulic fluid to flow from conduit 283 through check valve 286, solenoid valve 287, and conduit 288 into the cylinder 86 adjacent the side 280a of the piston. This pushes the piston toward side 280b, starting the downward motion of the support arm and scanning unit.

As the scanning head moves toward the billet, the oil in cylinder 86 on side 280b of the piston is forced through a conduit 290 at the other end of the cylinder, through an open port of solenoid valve 285, through the open port of a solenoid valve 289 operated by solenoid SOL-2, through an adjustable valve AV, a check valve 292 in a return conduit 293, and thence to the tank 275. The rate at which the hydraulic fluid leaves the cylinder 86 determines the speed at which the scanning unit approaches the billet. Adjustable valve AV is provided to regulate this flow.

As the scanning head approaches the billet, the cam lever arm 104 actuates limit switch LS-1 to energize coil relay CR2. This relay energizes the slow-down solenoid SOL-2, shifting the solenoid valve 289 to the left, as shown in FIG. 16, so that the flow of hydraulic fluid from the piston 86 is diverted from the valve AV and flows through a restriction valve RV. The restriction valve RV severely restricts the flow of hydraulic fluid from the piston 86 so that just before the scanning unit contacts the billet it comes to an almost complete stop, while yet continuing its downward movement.

As the scanning unit settles on the billet, the second limit switch LS-2 is actuated by the cam lever arm 104, energizing the relay TR1. This in turn energizes the raise head solenoid SOL-3. As shown in the hydraulic circuit, this moves the valve to the left so that hydraulic fluid flows through conduit 284 and conduit 290 to the side 280b of the piston as well as to the side 280a through valve 287. The oil pressure is equal on both sides of the piston 280, but the cylinder has a two to one ratio, as previously described. Thus, the pressure on side 280a maintains the scanning unit against the billet, while the pressure on 280b provides a cushioning effect and makes ready the raising of the scanning unit.

When the billet passes the photocells, solenoids SOL-1 and SOL-2 de-energize and the valves 287 and 289 return to their normal positions. Hydraulic fluid then no longer flows into cylinder 86 through valve 287 and conduit 288. Rather, valve 287 now connects to the tank 275 to exhaust fluid from the cylinder 86. Solenoid SOL-3, being energized by TR1, which is a time delay relay, is still energized for a period of one to two seconds. Thus, hydraulic pressure is exerted for a short time against the side 280b of the piston to force the piston and piston rod back to the right as shown in FIG. 16 and to force hydraulic fluid from the cylinder 86 through conduit 288 and check valve 295 to the storage tank 275. This raises the scanning unit from the surface of the billet and the unit is now ready for another cycle.

(2) Operation of the scanning system.—From the pump VP1, hydraulic fluid is supplied through the conduit 282 to a pressure relief valve PRV adjusted for a predetermined pressure output. For example, it may be suitably adjusted for an output of 900 p.s.i. From the valve PRV, the hydraulic fluid flows to the control valve 126, the position of which is controlled by the solenoid SOL-P, actuated by the proximity circuit of FIG. 14. With the valve 126 in the position shown in FIG. 16, hydraulic fluid under pressure is introduced into the right lower, end of stationary cylinder rod 118, forcing the cylinder 122 to the right to put the cylinder in proper position, ready for operation.

As explained in conjunction with the proximity circuit, when the scanning unit is positioned on the billet and the top proximity coil senses metal, the solenoid SOL-P is energized and the valve 126 shifts. As shown in FIG. 16, the valve 126 shifts to the left so that hydraulic fluid is introduced through conduit 282, through the valve 126 to conduit 298 and hence to the left end of the cylinder rod 118. This fills the cylinder 122 to the left of the piston 124, forcing the cylinder 122 to move to the left. At the same time, hydraulic fluid to the right of the piston 124 is forced through the right hand end of the rod 118, through the valve 126 and thence to a conduit 299, through a check valve 300, through a conduit 302, a heat exchanger 304, and back to the storage tank 275.

The cylinder 122 continues to move to the left, in an upward direction, until the top proximity coil senses air; i.e., when it passes beyond the edge of the billet. At this time, the solenoid SOL-P is de-energized and the valve 126 returns to its normal position. The hydraulic fluid once again flows through conduit 282, through the valve 126 and to the lower or right end of cylinder rod 118, to force the cylinder 122 to the right. At the same time, hydraulic fluid is forced from the left side of the cylinder 122 through the cylinder rod 118, the conduit 298, through the valve 126, the conduit 299, check valve 300, conduit 302 to the heat exchanger 304 and thence to the storage tank 275. The cylinder 122 continues its downward path to the right, until the bottom proximity coil moves beyond the surface of the billet and senses air. At this time, the solenoid SOL-P is again energized, shifting the valve 126 and starting the cylinder 122 in the opposite direction. This reciprocating operation of the cylinder 122 continues throughout the time during which the billet is in the inspection station, thereby scanning the full length of the billet in a zigzag path.

(C) The pneumatic system

The pneumatic system for operating the defect markers, the cylinder for raising and lowering the search coils of each scanning unit, and the cylinder for positioning the calibration bar is shown diagrammatically in FIG. 17 of the drawings.

An air supply conduit 310 provides a source of air under pressure. A shut-off valve 312 controls the flow of air to the pneumatic system of the scanning unit. An air regulator 314 establishes a suitable pressure for the system; for example, 70 p.s.i. An air pressure switch ASW, corresponding to the switch shown in line L14 of the control circuit of FIG. 12 controls the flow of air through conduit 310. If at any time the pressure drops below a desired pre-set value, for example 60 pounds per square inch gauge, the air pressure switch opens the contacts in line L14 of the control circuit to de-energize the relay coil CRM, opening the associated contacts, thereby shutting off the power to the unit.

At a juncture 315 in the air conduit 310, the air is divided. Part goes through a conduit 316 to supply air under pressure to the two scanning heads of the one of the inspection stations, and the other portion of the air is conveyed through conduit 317 to the two scanning heads of the second inspection station. Because the arrangement of each inspection station is identical, the pneumatic system will be described in connection with only the one supplied by conduit 316.

At a juncture 318 in the conduit 316, the air being supplied to the two scanning units of the one inspection station is divided. Part of the air is supplied by the conduit 320 to one of the scanning heads 105 indicated diagrammatically in dotted line and the remaining air is supplied through a conduit 321 to the second scanning unit, not shown. Both units being identical, only one will be described in detail. In addition, air is supplied by juncture 318 through a conduit 322 to operate the pneumatic cylinders 116 and 231. Cylinder 116 raises and lowers the search coils of the scanning unit 105 and cylinder 231 raises and lowers the calibration bar associated with the inspection station. The air lines going to the scanning units or heads furnish atomizing pressure to each spray marker, pressurize a paint tank which supplies paint to the markers, and operate a plunger of each marker, as will be explained in more detail below.

The air supplied through conduit 320 divides at a juncture 324. A portion of the air flows through each of three conduits 325, 326, and 327. The air flowing through conduit 325 is reduced in pressure by an air regulator 328. For example, the air may be reduced from a pressure of 70 p.s.i. to 15 p.s.i. The output from the conduit 325 is then introduced to the two paint markers 114 and 115 of the scanning head. This output is known as the atomizing pressure and is supplied through the nozzles of the paint markers at all times. This insures that the paint applied will be properly atomized so that a neat and accurate mark is applied to the billet.

From the juncture 324, the air is also supplied through the conduit 326 to an air regulator 330. This regulator is adjusted to reduce the air pressure to a value slightly in excess of the atomizing pressure. For example, the air regulator 330 may reduce the air pressure from 70 p.s.i. to 20 p.s.i. The air is introduced to a paint tank 332 to pressurize the tank. The paint from the tank 332 is introduced through conduits 333 and 334 to the paint markers 114, 115, respectively, under a pressure of 20 pounds per square inch. The paint, at this time, is blocked from coming out of the markers by spring loaded plungers (not shown).

From the juncture 324 the air is also supplied through conduit 327 and is divided at a juncture 336, so as to flow through conduits 338 and 339. Each of these conduits goes to an air valve 340, 341, respectively, corresponding to the valves indicated by boxes 264, 265 in the signalling circuit of FIG. 15. Each air valve is solenoid controlled. The solenoids are electrically energized from the marker panels shown in the block diagram of FIG. 15. When the solenoid of either valve is energized electrically from the marker panel, the air valve shifts. Air at 70 p.s.i. pressure is thereby introduced to the associated marker 114 or 115 through conduits 343 or 344 respectively. This pressure raises the plunger in the marker to allow paint from tank 332 to be dispensed. The paint is atomized by the flow of air through the marker is blocked and a spring return on the plunger is marked. When the solenoid is de-energized, the air to the marker is blocked and a spring return on the plunger seats the plunger, blocking the flow of paint.

Returning to the juncture 318, air under pressure is supplied through conduit 322 to the raise and lower cylinders of each search unit or head of the inspection station and also to the calibration bar cylinder. Conduits 346 and 348 supply the air under pressure to the raise and lower cylinders, which are identical for each head. Accordingly, only the one supplied by conduit 346 will be described in detail. Air under pressure is introduced through conduit 346 to the raise and lower cylinder 116 through an air valve 350 operated by the solenoid SOL-4, and through conduits 352 and 353. As diagrammatically shown in the drawing, air under pressure is always supplied to one side or other of the piston in cylinder 116. With the valve 350 in normal position, the search coil cylinder is actuated to maintain the search coils in an up position. When the solenoid SOL-4 associated with the valve 350 is energized, the valve shifts and the cylinder 116 and associated piston rod 148 lower the search coils into scanning position adjacent the billet.

The conduit 322 supplies air under pressure to the calibration bar cylinder 231 through an air valve 355 operated by the calibration bar solenoid SOL-5. This valve and cylinder operate in the same manner as valve 350 and cylinder 116, except that the calibration bar cylinder is normally in a position with the calibration bar down when air pressure is on. When solenoid SOL-5 is actuated, the valve 355 is shifted and the calibration bar is raised. Because there is always air pressure on one side of cylinders 116 and 231, the piston rods are always either extended or retracted under a positive force.

(IV) OPERATION IN SUMMARY

Briefly, a summary of the operation is as follows:

A billet, which has been grit blasted, is to be conveyed along predetermined scanning paths $P_1$ and $P_2$ to be inspected for flaws, such as seams at or near the surface of the billet. The billet is to be conveyed through inspection stations 20, 22. Each inspection station will inspect two adjacent surfaces of the billet.

If necessary, the scanning units of each inspection station are first calibrated. This is accomplished by connecting the pendant or portable push-button station into the control circuit and by placing the operational switches of the control circuit in the manual position. Power is supplied by closing switch DSW. Switch PRS is closed to activate the control circuit and the pump motor is started by closing switch HPS.

The calibration bar is raised into calibrating position by pressing the "calibration bar up" switch. The scanning head to be calibrated is then lowered by pressing the "lower head" button. After the head has been lowered the search coils are lowered by pressing the "lower search coil" button. The scanning unit now operates and the sensitivity of the electronic equipment may be set in accordance with the known condition of the calibrating bar. When calibration has been completed, the scanning head is raised and the calibrating bar is lowered. This is accomplished by pressing the "calibration bar down" button.

To begin the inspection cycle, the operational switches MOA and MOA2 are both placed in the automatic position. The DSW switch is on and the "power on reset" switch PRS and the start switch HPS are closed. When the automatic start button ASB is thereafter pressed the scanning units are ready for automatic operation and will begin scanning as soon as a billet intercepts the light beams to photocells 60, 61.

By way of example, a steel billet of a length between 6 feet and 30 feet and three inches square may be suitably conveyed at a speed of 75 feet per minute along the conveying paths $P_1$ and $P_2$. As the billet enters an inspection station, e.g., inspection station 22, it first intercepts the light beams to the two photocells 60, 61 associated with the first scanning head. This causes support arm 49 to rapidy descend, carrying the scanning unit 105 toward the billet. Cam 103 carried by lever arm 104 first contacts the surface of the billet, closing limit switch LS1 and reducing the speed of movement of the arm 49. Further movement of the support arm 49 causes lever arm 104 to close a second limit switch LS2 which, in combination with the interception by the billet of the light beam to the third photoelectric cell 62, causes the sub-assembly 107 with the search coils 110, 111 to be lowered into contact with the surface of the billet. At the same time a counteracting force is applied in the hydraulic system to reduce the amount of force by which the arm 49 is biased against the billet.

With the scanning unit in adjacent position to the billet, the top proximity coil senses metal while the bottom proximity coil does not. Solenoid SOL-P therefore becomes energized, actuating the valve 126, which supplies fluid to the cylinder 122 and the scanning unit 105 begins to move across the surface of the billet.

With a three inch wide billet moving approximately 75 feet per minute, the scanning head may be suitably reciprocated transversely of the billet at a speed of approximately 90 feet per minute. The path of movement of the search coils across a moving billet B under such conditions is shown diagrammatically in FIG. 18. Each twin search coil 110 and 111 follows the path indicated by the lines 111P and 110P, respectively. Each time the scanning head reaches the lateral edge of the billet, it is automatically reversed in direction by the control valve 126, as actuated by the proximity coils, 112, 113.

The twin search coils carried by the scanning head are sensitive to defects, such as seams which penetrate the surface of a billet. When a defect is detected, the search coil triggers the trailing defect marker which, after a suitable delay, deposits a paint mark directly over the detected defect. Only the trailing marker is actuated because the proximity circuit, through relay MR, reverses the operation of the defect markers 114, 115 each time the direction of the scanning unit is reversed.

Both upward facing surfaces of the billet are being inspected in the above described manner simultaneously by the two scanning units of the inspection station. The manner in which the second scanning unit of the inspection station is automatically actuated and operated is the same as already described for the first unit. The billet is conveyed first through one inspection station to inspect two adjacent surfaces, and is then turned over to inspect the other two surfaces. In the arrangement disclosed, the direction of the billet is reversed to permit the two stations to be arranged side by side. Obviously, the two stations could be in tandem.

When the trailing end of the billet passes beneath a scanning unit, the light beams to the photocells 60, 61 just in advance of the unit are no longer broken and the contacts PE-1 and PE-2 open. This de-energizes relay CR1 and relay TR1, which control, respectively, the fast-approach solenoid SOL-1 and the raise-head solenoid SOL-3. The solenoids actuate the valves 285, 287 that control the flow of hydraulic fluid to the cylinder 86. Fluid pressure is no longer exerted in a direction that biases the arm 49 toward the billet. Due to the time delay of relay TR1, the counterbalancing force on the cylinder 86 remains for a short time and causes the arm 49 to be raised from the inspecting position.

It will be apparent from the above, that the inspection assembly of the present invention will automatically scan the width of the billet, which may be of varying dimensions, without requiring adjustment of the apparatus, and will continue to scan the billet from beginning to end, regardless of the length. After scanning a complete billet, the scanning assembly is automatically retracted from scanning position, in readiness to inspect a subsequent billet.

While a preferred embodiment of the invention has been described in the foregoing disclosure, it will be apparent that numerous modifications or alterations may be made therein without departing from the spirit and scope of the invention as set forth in the appended claims.

What is claimed is:

1. In apparatus for electromagnetically inspecting articles: a support movable toward and away from an article to be inspected, a surface scanning unit carried by and reciprocable relative to said support, said scanning unit including a search unit for electromagnetically detecting defects in an article being inspected; a first actuator for selectively moving said support toward and away from the article to be inspected; a second actuator carried by said support for reciprocating said scanning unit relative to said support; and means mounting the search unit for movement independent of the support and scanning unit toward and away from the article being inspected.

2. The apparatus of claim 1 wherein said means include a pneumatic actuator for moving the search unit independently of the movable support and scanning unit toward and away from the article being inspected.

3. Apparatus for electromagnetically inspecting elongated articles, which comprises: means for moving an elongated article along a predetermined path; means along said predetermined path for sensing the presence of the article at a predetermined location; an article scanning unit including search coils for electromagnetically detecting defects in an article; means carrying said scanning unit adjacent said path for movement transversely of said path toward and away from an article to be inspected; means, including a selectively operable actuator, supporting said search coils for independent movement relative to the scanning unit toward and away from said article; and means carried with the scanning unit toward and away from said article for sensing when the scanning unit carrying means has located the scanning unit proximate to said article and for controlling said actuator to move the search coils toward said article independently of said scanning unit and scanning unit carrying means.

4. The apparatus of claim 3 including additional sensing means along said predetermined path to sense the presence of the article at a position subsequent to that at which it was previously sensed, for controlling said actuator in combination with the sensing means carried with the scanning means.

5. The apparatus of claim 3 including means carried by said scanning unit carrying means for riding in contact with the article and limiting the proximity of the scanning unit to the article.

6. The apparatus of claim 3 including means, carried by said means carrying the scanning unit, for reciprocating the scanning unit relative to said carrying means and relative to said article in a direction transversely of the predetermined path.

7. In a method of electromagnetically inspecting a relatively flat longitudinally extending surface of an elongated metal billet, the steps comprising moving the billet at an essentially uniform speed along a predetermined path of travel, moving a device for electromagnetically sensing defects in the billet transversely across said longitudinal surface of the billet, sensing a longitudinally extending edge of said billet surface when the defect sensing device is at a predetermined position relative to said edge and reversing the direction of transverse movement of the defect sensing device in response to said edge sensing.

8. In a method of inspecting an elongated metal billet that is generally rectangular in cross section, the steps comprising establishing relative movement between a billet and a device for sensing defects in the billet in a direction longitudinally of the billet, moving the device transversely back and forth across a surface of the billet as the two are moved relative to each other longitudinally of the billet, moving a device for electrically sensing edges of the billet transversely back and forth across the surface of the billet in coordination with the transverse movement of the device for sensing defects, and reversing the direction of transverse movement of the device for sensing defects and the device for sensing edges of the billet each time a billet edge is sensed.

9. The method of claim 8 including the step of signalling the detection of each defect sensed in the surface of the billet being inspected.

10. In apparatus for inspecting an article as one of the article and apparatus is moved relative to the other along a predetermined path: a scanning unit for inspecting a surface of the article; means for moving the scanning unit in a rectilinear path transversely of said predetermined path and across the surface of the article, which surface has opposed edge portions; sensing means carried by the scanning unit for sensing defects in the article; two edge sensing means carried by said scanning unit, one carried in advance of the defect sensing means and one carried behind the defect sensing means relative to the direction of movement of the scanning unit, and both carried in advance of the defect sensing means, with respect to the direction of relative movement between the article and the apparatus along the predetermined path; and control means for reversing the direction of movement of the scanning unit along the rectilinear path when one edge sensing means passes beyond the edge of the article.

11. The apparatus of claim 10 wherein the means for moving the scanning unit includes a fluid actuator and a solenoid operated valve for reversing the direction of movement of the fluid actuator and wherein the two edge sensing means include transducer coils that control the energization of the solenoid operated valve to reverse the direction of movement of the fluid actuator.

12. In a method of electromagnetically inspecting a relatively flat longitudinally extending surface of an elongated metal billet, the steps comprising moving the billet at an essentially uniform speed along a predetermined path of travel, moving a device for electromagnetically sensing defects in the billet transversely across said longitudinal surface of the billet, sensing defects in the billet with said device, independently sensing a longitudinally extending edge of said billet surface when the defect sensing device is adjacent said edge but still opposite the billet surface and reversing the direction of transverse movement of the defect sensing device in response to said edge sensing.

13. In apparatus for electromagnetically inspecting an article as one of the article and apparatus is moved relative to the other along a predetermined path: a support movable toward and away from the article; a scanning unit carried by and reciprocable relative to said support for inspecting a surface of the article; a search unit carried by the scanning unit carrying defect sensing means over the surface of the article to detect defects in the article being inspected; means mounting the search unit for movement independently of the support and scanning unit toward and away from the article; means for moving the scanning unit in a rectilinear path transversely of said predetermined path and across the surface of the article, which surface has opposed edge portions; two edge sensing means, electrically independent from said defect sensing means, carried by said scanning unit, one carried in advance of the defect sensing means and one carried behind the defect sensing means relative to the direction of movement of the scanning unit, and both carried in advance of the defect sensing means, with respect to the direction of relative movement between the article and the apparatus along the predetermined path; and control means for reversing the direction of movement of the scanning unit along the rectilinear path when one edge sensing means passes beyond the edge of the article and while the defect sensing means remains over the surface of the article.

References Cited

UNITED STATES PATENTS

| | | | |
|---|---|---|---|
| 3,244,972 | 4/1966 | Fisher | 324—37 |
| 3,309,913 | 3/1967 | Weighart | 73—67.8 |
| 3,345,563 | 10/1967 | Wood | 324—37 |
| 3,359,495 | 12/1967 | McMaster et al. | 324—45 |
| 3,416,364 | 12/1968 | Wycherley et al. | 73—67.8 |

OTHER REFERENCES

Harmon, W. C.: Witchcraft in the Inspection of Steel, Iron & Steel Engineer, January 1964, pp. 91–97.

RUDOLPH V. ROLINEC, Primary Examiner

R. J. CORCORAN, Assistant Examiner

U.S. Cl. X.R.

73—67.8